(12) United States Patent
Talken et al.

(10) Patent No.: US 7,416,073 B1
(45) Date of Patent: Aug. 26, 2008

(54) DIVERTING FLAT BELT SUPPORT SYSTEM

(75) Inventors: Daniel J. Talken, Lafayette, CA (US);
Charles D. Rizzuti, Martinez, CA (US)

(73) Assignee: Geo. M. Martin Company, Emeryville, CA (US)

( * ) Notice: Subject to any disclaimer, the term of this patent is extended or adjusted under 35 U.S.C. 154(b) by 22 days.

(21) Appl. No.: 11/704,595

(22) Filed: Feb. 9, 2007

(51) Int. Cl.
*B65G 39/16* (2006.01)

(52) U.S. Cl. .................. 198/806; 198/842; 198/457.03

(58) Field of Classification Search ................. 198/806, 198/807, 839, 842, 843, 457.03, 817, 835
See application file for complete search history.

(56) References Cited

U.S. PATENT DOCUMENTS

| | | | |
|---|---|---|---|
| 1,086,353 A | 2/1914 | Dick | |
| 1,252,681 A | 1/1918 | Friess | |
| 1,454,657 A | 5/1923 | Smith | |
| 1,569,033 A | 1/1926 | Reichel | |
| 1,666,576 A | 4/1928 | Lytle | |
| 2,205,767 A | 6/1940 | Lamb | |
| 2,279,887 A | 4/1942 | Hathorn | |
| 2,593,158 A | 4/1952 | Lorig | |
| 2,745,538 A | 5/1956 | Lamb | |
| 2,804,196 A | 8/1957 | Planett | |
| 2,895,552 A | 7/1959 | Pomper et al. | |
| 2,901,250 A | 8/1959 | Martin | |
| 3,022,999 A | 2/1962 | Mead | |
| 3,052,396 A | 9/1962 | Butscher | |
| 3,113,809 A | 12/1963 | Eggmann | |
| 3,143,344 A | 8/1964 | Miller et al. | |
| 3,362,707 A | 1/1968 | Lauren | |
| 3,410,183 A | 11/1968 | Sarka | |
| 3,546,733 A | 12/1970 | Johnson | |
| 3,550,493 A | 12/1970 | Benbenek et al. | |
| 3,577,892 A | 5/1971 | Moore | |
| 3,603,448 A | 9/1971 | Okano et al. | |
| 3,659,840 A | 5/1972 | Ruck | |
| 3,698,707 A | 10/1972 | Lucas | |
| 3,764,024 A | 10/1973 | Mojden | |
| 3,837,178 A | 9/1974 | Hackforth | |
| 3,860,232 A | 1/1975 | Martin | |

(Continued)

FOREIGN PATENT DOCUMENTS

EP 0145827 6/1985

(Continued)

OTHER PUBLICATIONS

US 6,736,387, 05/2004, Ohlmann (withdrawn)

*Primary Examiner*—Mark A Deuble
(74) *Attorney, Agent, or Firm*—James R. Cypher; Charles R. Cypher

(57) ABSTRACT

A flat belt support system with a drive roller and paired pulleys, each pair carrying a continuous flat belt that can be moved laterally along the drive roller axis and angled away from the plane normal to the drive roller axis. Multiple belts, each carried by a pair of pulleys, can be driven by a single drive roller. An additional roller allows the drive roller to be positioned so that it contacts the flat belt cover, rather than the back of the flat belt, improving friction between the drive roller and the flat belt.

23 Claims, 16 Drawing Sheets

U.S. PATENT DOCUMENTS

| | | | |
|---|---|---|---|
| 3,880,420 A | 4/1975 | Martin | |
| 3,892,168 A | 7/1975 | Grobman | |
| 3,905,487 A | 9/1975 | Hoke et al. | |
| 3,975,013 A | 8/1976 | Deisting | |
| 3,977,671 A | 8/1976 | Taylor et al. | |
| 3,982,750 A | 9/1976 | Pulda | |
| 3,998,453 A | 12/1976 | Dorer | |
| 4,061,222 A * | 12/1977 | Rushing | 198/807 |
| 4,133,523 A | 1/1979 | Berthelot | |
| 4,169,530 A | 10/1979 | Fryatt | |
| 4,222,697 A | 9/1980 | Vits | |
| 4,331,273 A | 5/1982 | Hyatt | |
| 4,352,447 A | 10/1982 | Bonaddio | |
| 4,372,435 A | 2/1983 | Bradbury | |
| 4,406,359 A | 9/1983 | Cole et al. | |
| 4,433,774 A | 2/1984 | Lopes | |
| 4,500,243 A | 2/1985 | Ward, Jr. et al. | |
| 4,527,686 A * | 7/1985 | Satoh | 198/807 |
| 4,530,632 A | 7/1985 | Sela | |
| 4,538,801 A | 9/1985 | Van Pelt | |
| 4,552,295 A | 11/1985 | Smith et al. | |
| 4,632,378 A | 12/1986 | Sardella | |
| 4,652,197 A | 3/1987 | Littleton | |
| 4,685,551 A | 8/1987 | Ono | |
| 4,694,637 A | 9/1987 | Bech | |
| 4,740,193 A | 4/1988 | Frost et al. | |
| 4,799,847 A | 1/1989 | Bodewein | |
| 4,844,234 A | 7/1989 | Born | |
| 4,846,336 A | 7/1989 | Hoyland | |
| 4,861,014 A | 8/1989 | Martin | |
| 4,880,104 A | 11/1989 | Evans | |
| 4,986,056 A | 1/1991 | Evans | |
| 5,026,249 A | 6/1991 | Shill | |
| 5,133,543 A | 7/1992 | Eitel et al. | |
| 5,149,081 A | 9/1992 | Greive | |
| 5,163,891 A | 11/1992 | Goldsborough | |
| 5,178,383 A | 1/1993 | Moser | |
| 5,180,342 A | 1/1993 | Van Ee | |
| 5,182,986 A * | 2/1993 | Bielfeldt | 100/41 |
| 5,238,240 A | 8/1993 | Prim | |
| 5,265,867 A | 11/1993 | Magee | |
| 5,312,176 A | 5/1994 | Crabb | |
| 5,427,581 A | 6/1995 | McGrath et al. | |
| 5,515,139 A * | 5/1996 | Hou et al. | 399/38 |
| 5,810,149 A | 9/1998 | Sandberg et al. | |
| 5,964,339 A * | 10/1999 | Matsuura et al. | 198/810.03 |
| 5,980,196 A | 11/1999 | Roth | |
| 6,000,531 A | 12/1999 | Martin | |
| 6,171,051 B1 | 1/2001 | Hamers | |
| 6,209,707 B1 | 4/2001 | Ronchi | |
| 6,286,663 B1 | 9/2001 | Hartmann | |
| 6,332,528 B1 | 12/2001 | Rink | |
| 6,427,097 B1 | 7/2002 | Martin | |
| 6,427,999 B1 | 8/2002 | Christofferson | |
| 6,523,678 B2 | 2/2003 | Roessler | |
| 6,557,846 B2 | 5/2003 | Martin | |
| 6,817,604 B2 | 11/2004 | Ohlmann | |
| 6,986,635 B2 | 1/2006 | Talken | |
| 7,048,111 B2 | 5/2006 | Christofferson | |
| 7,104,747 B2 | 9/2006 | Talken | |
| 7,150,383 B2 | 12/2006 | Talken | |

FOREIGN PATENT DOCUMENTS

| | | |
|---|---|---|
| EP | 0783055 | 7/1997 |
| WO | WO9600856 | 1/1996 |

* cited by examiner

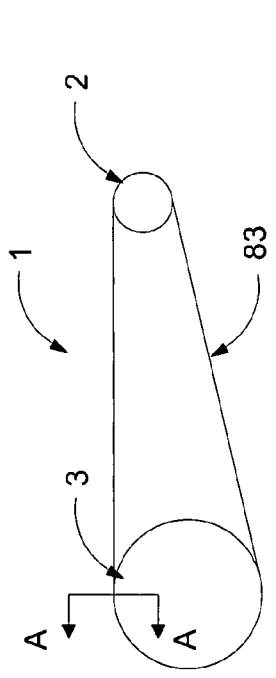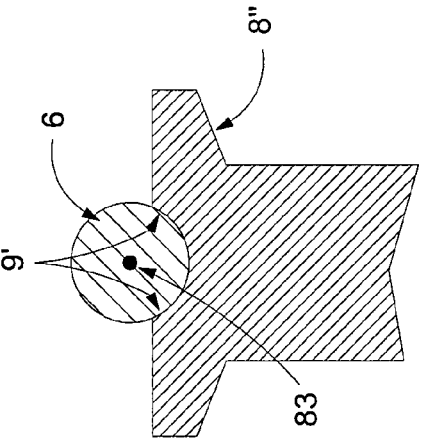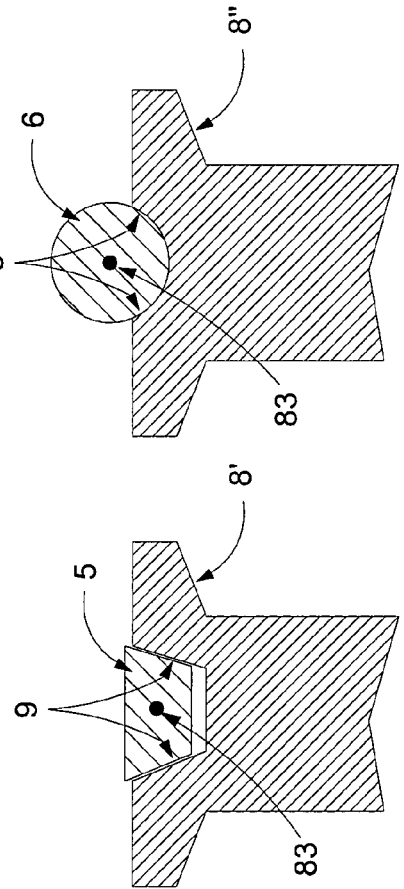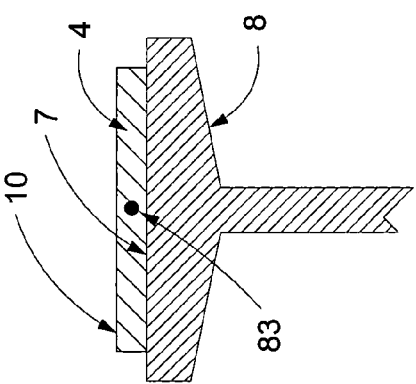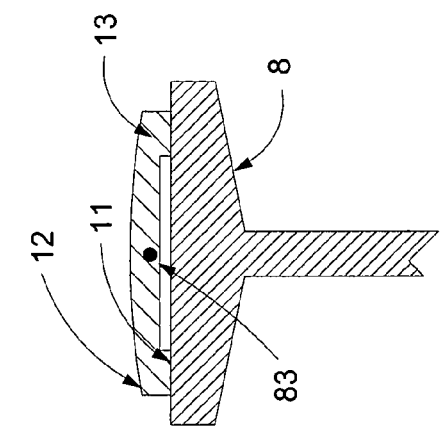

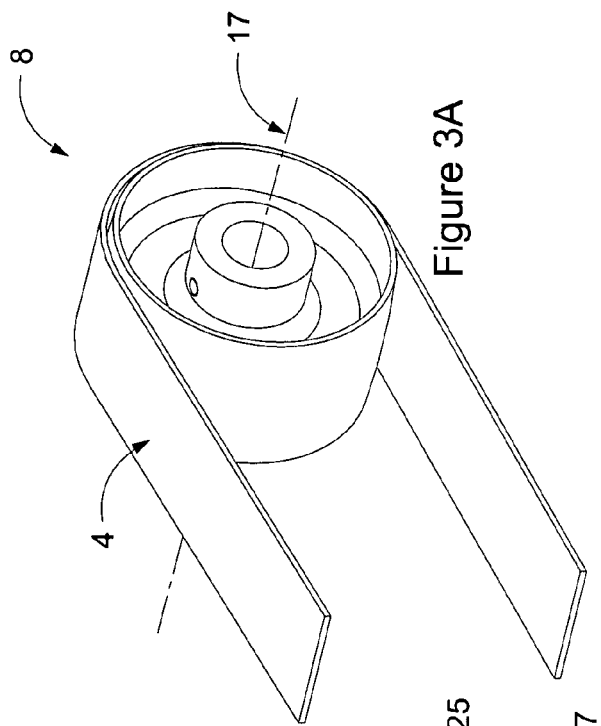
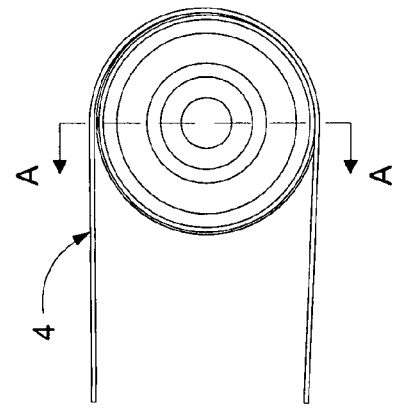
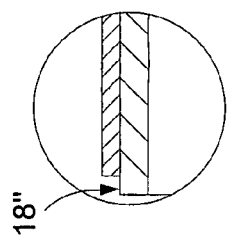
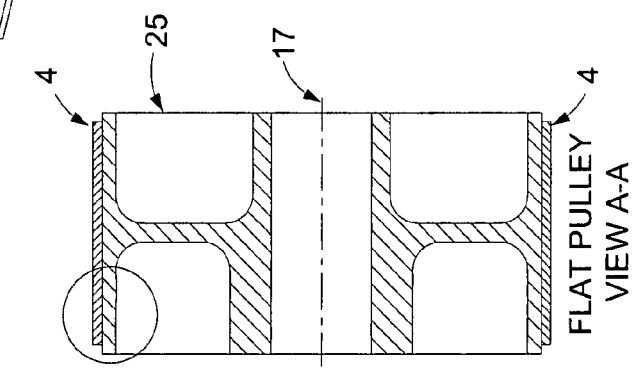
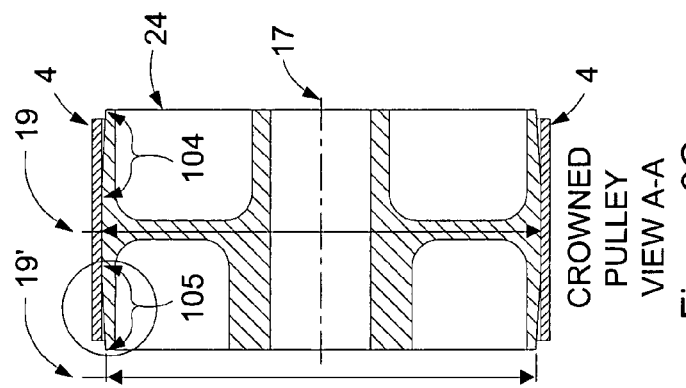
Figure 3A
Figure 3B
Figure 3C' Figure 3C CROWNED PULLEY VIEW A-A
Figure 3D' Figure 3D FLAT PULLEY VIEW A-A

VIEW A-A

VIEW A-A

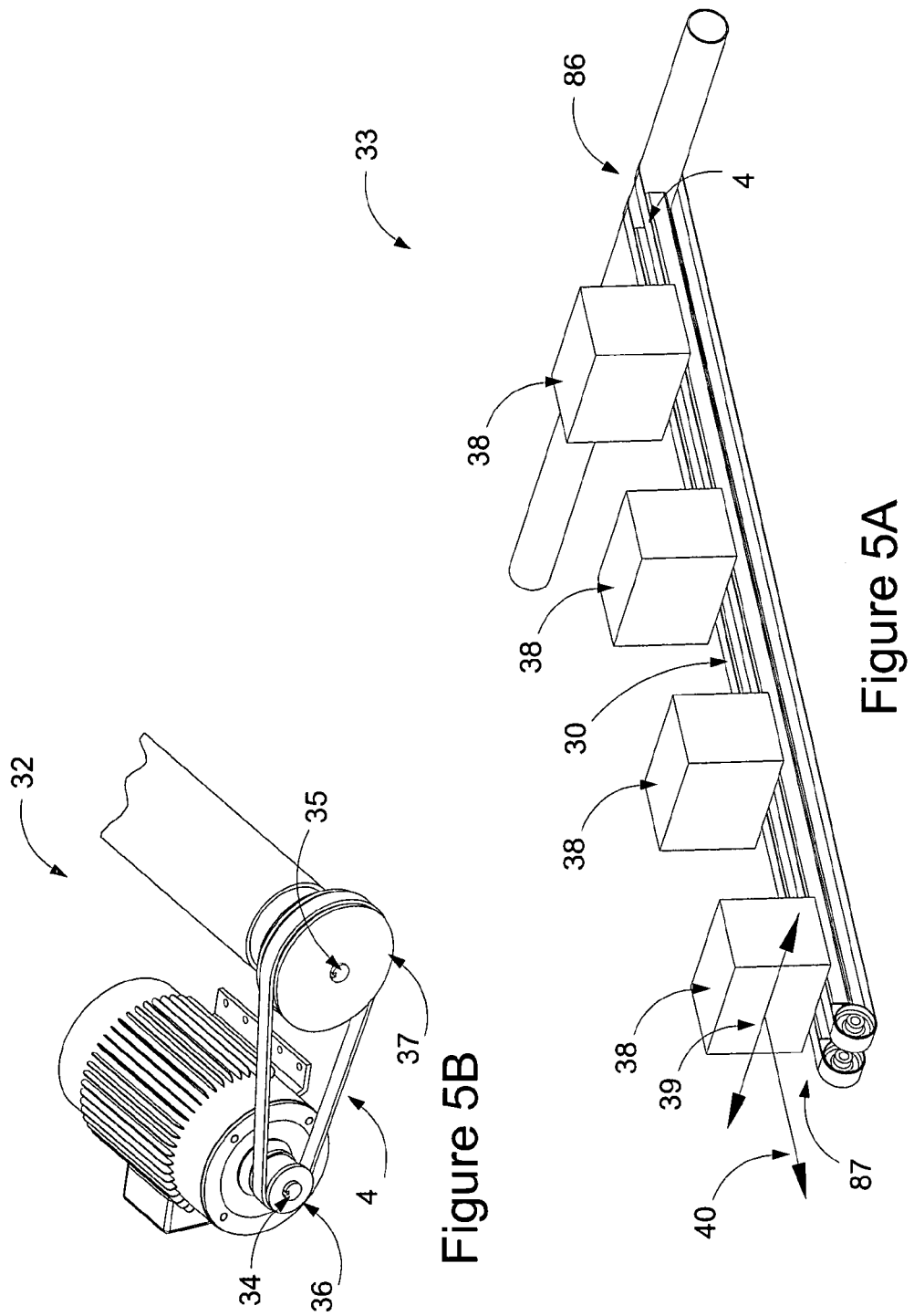

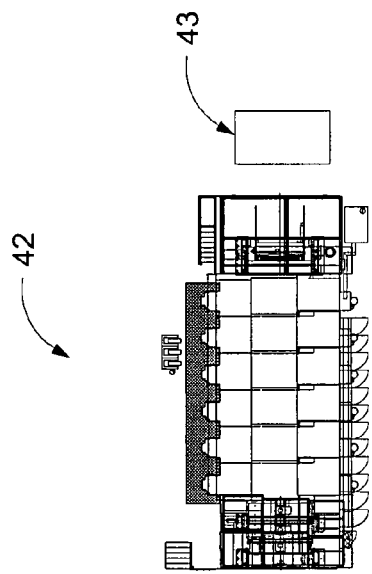
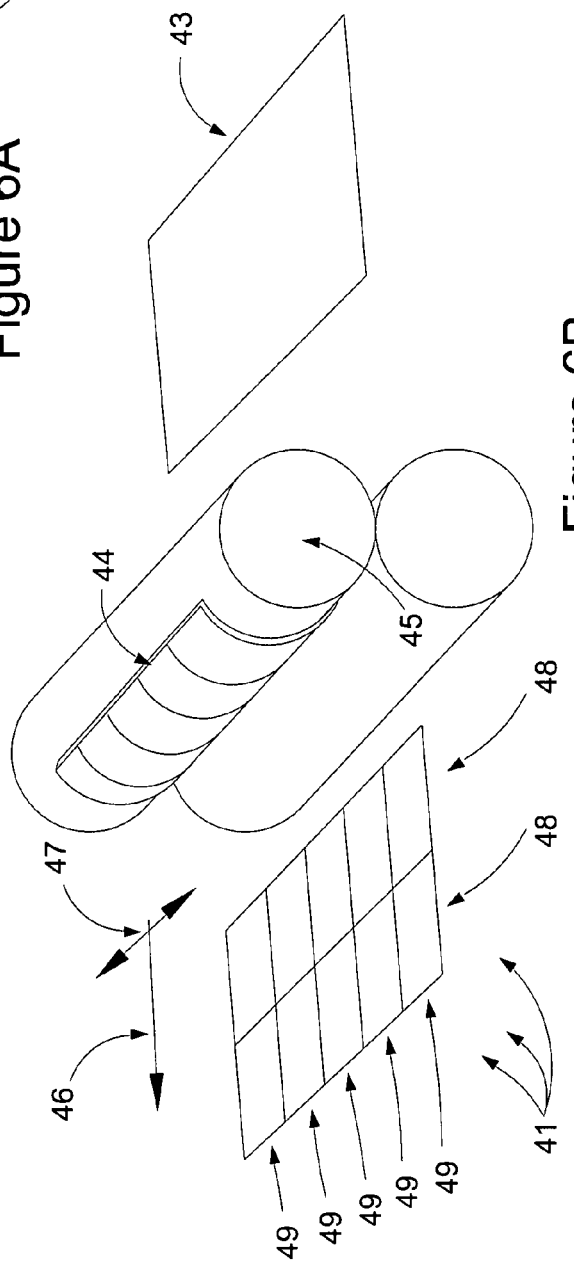
Figure 6A
Figure 6B

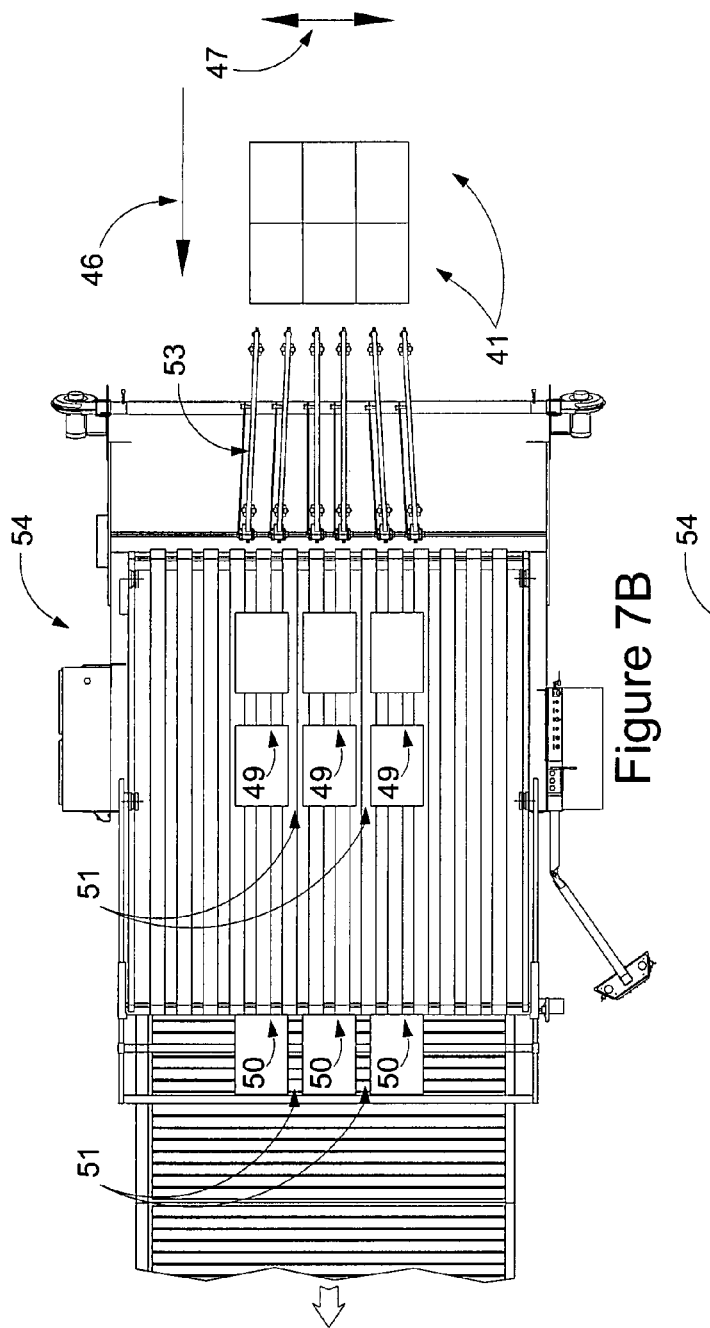
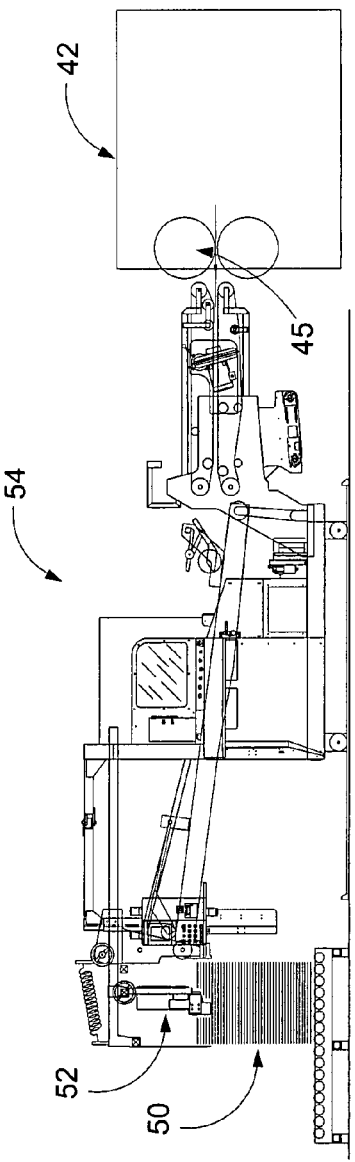
Figure 7B
Figure 7A

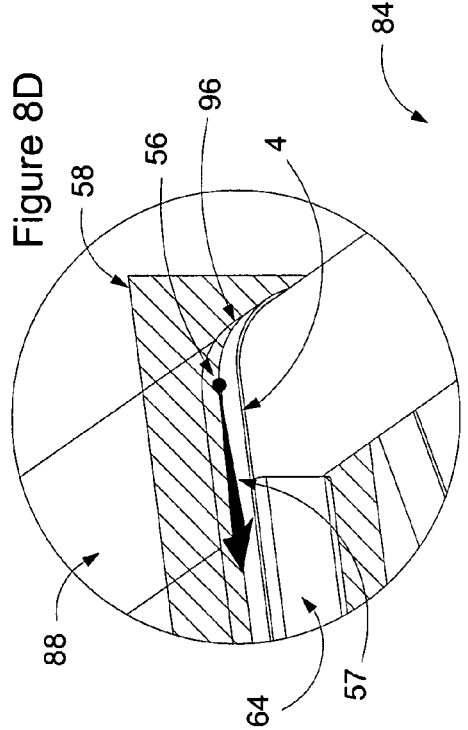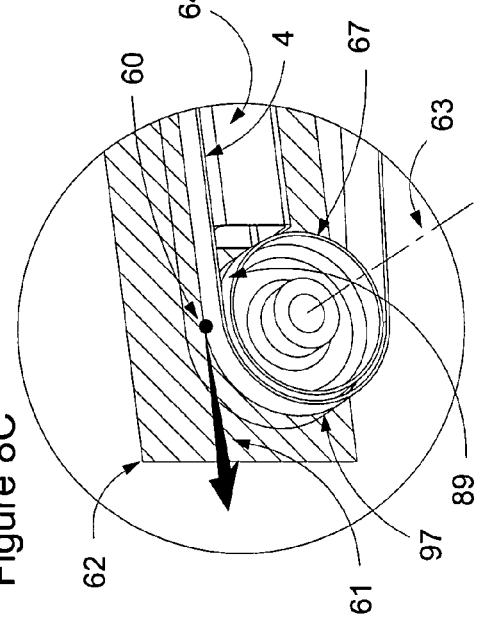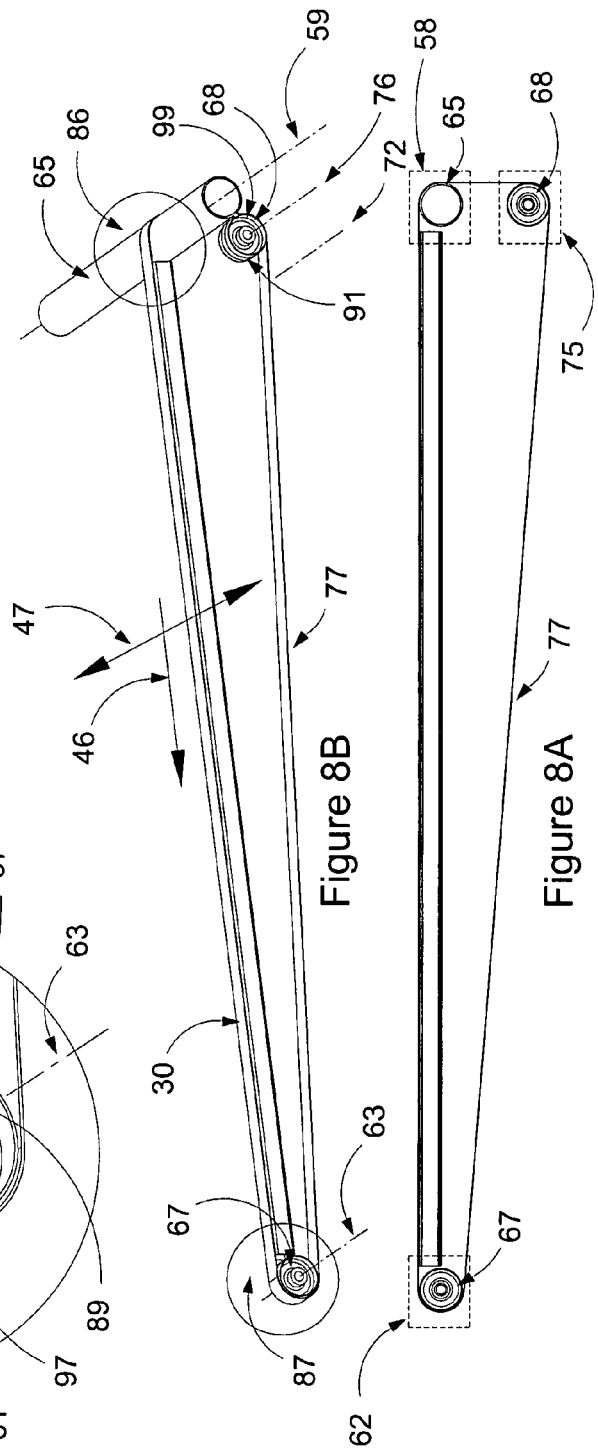

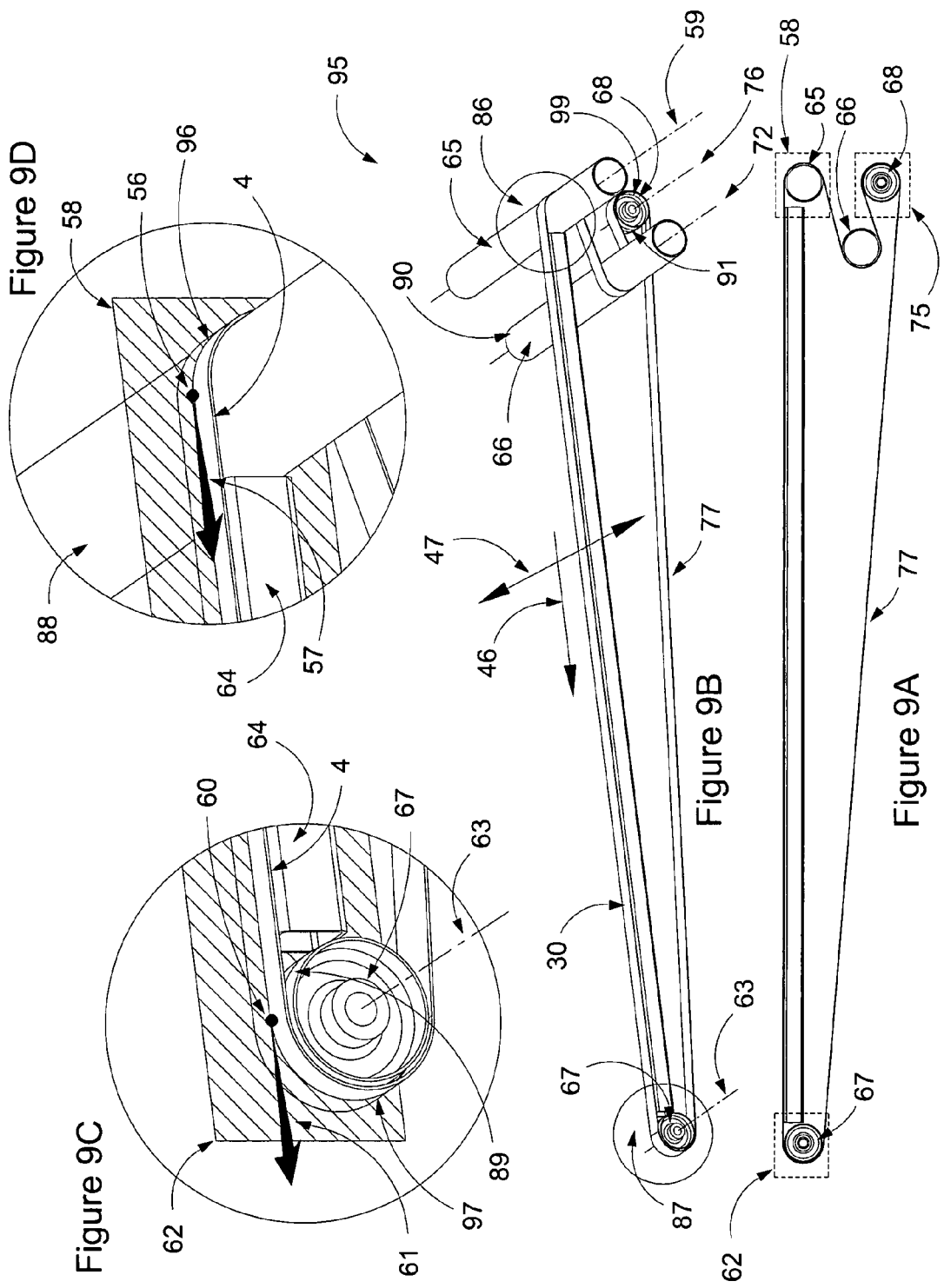

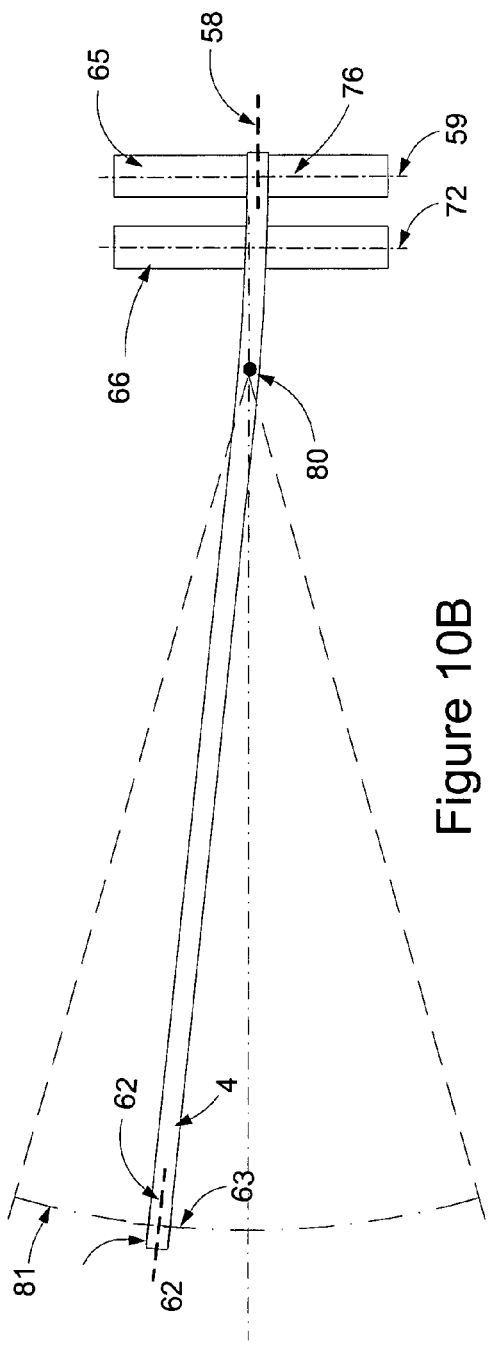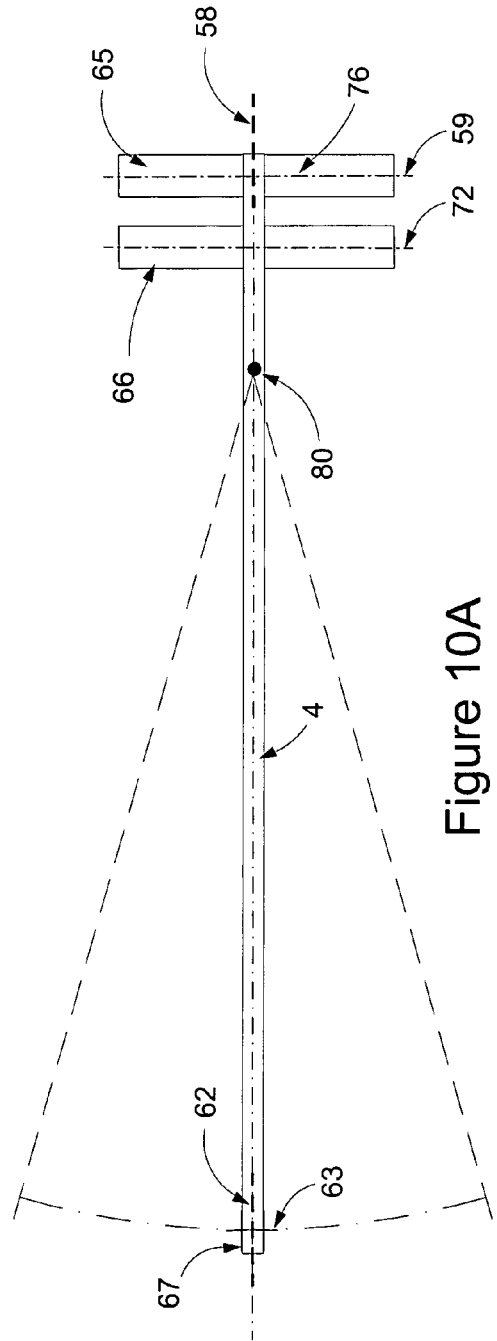
Figure 10B
Figure 10A

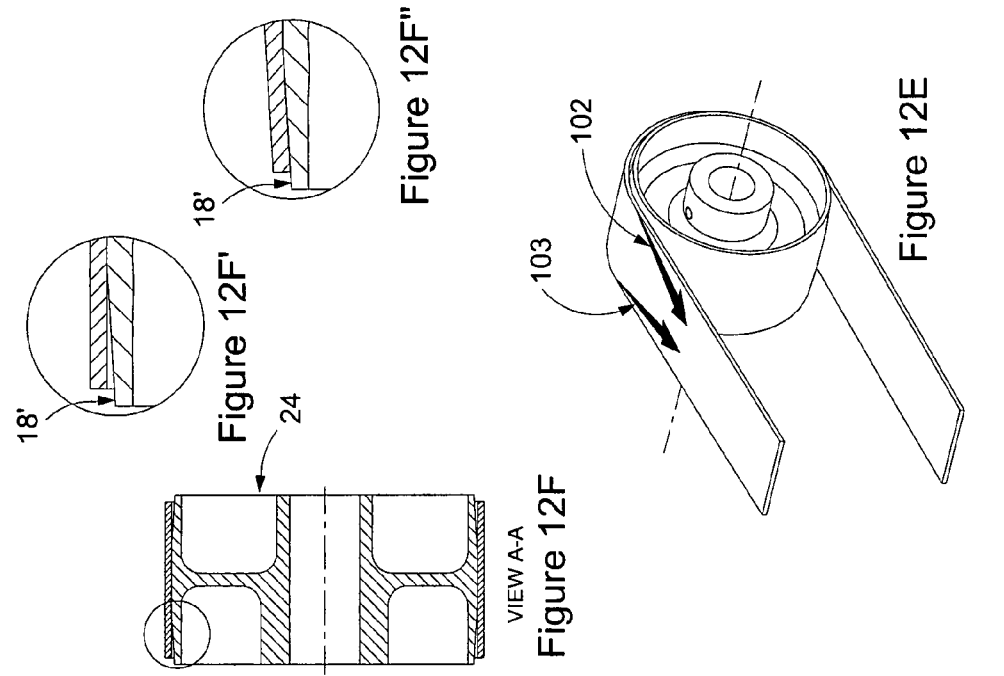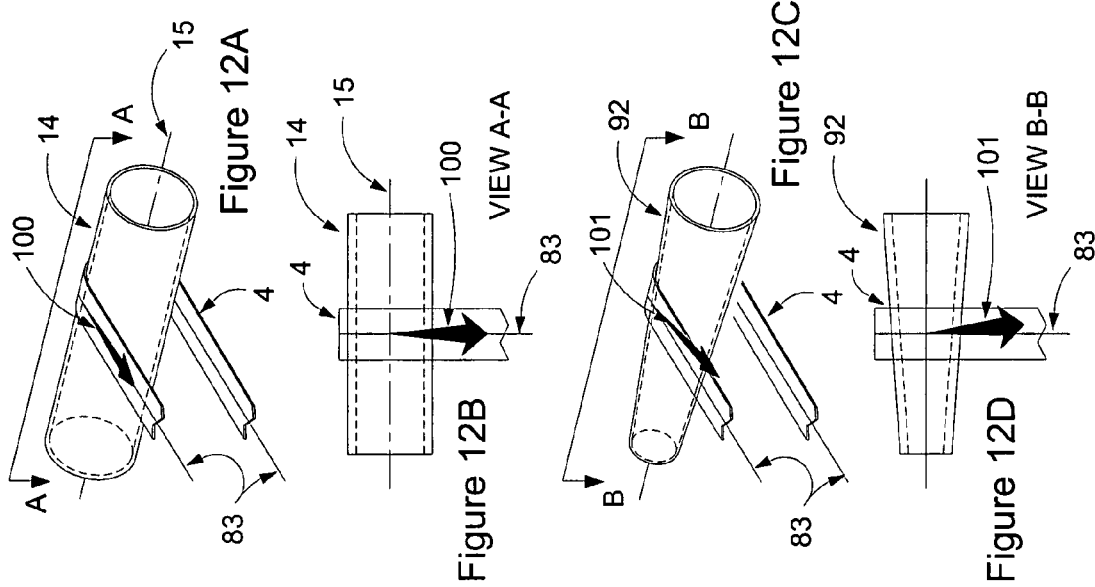

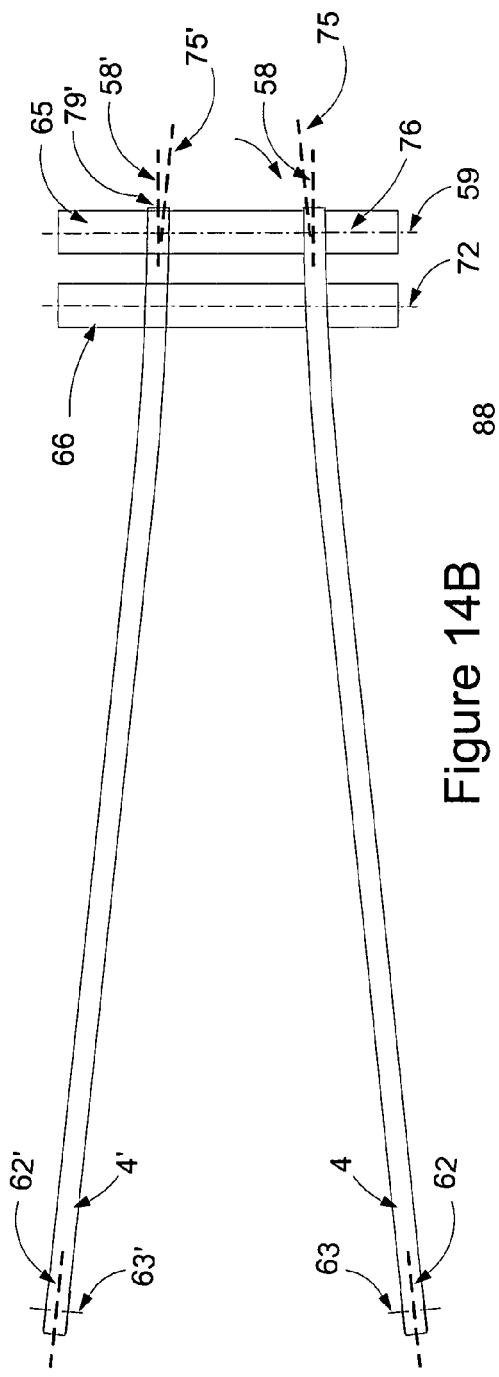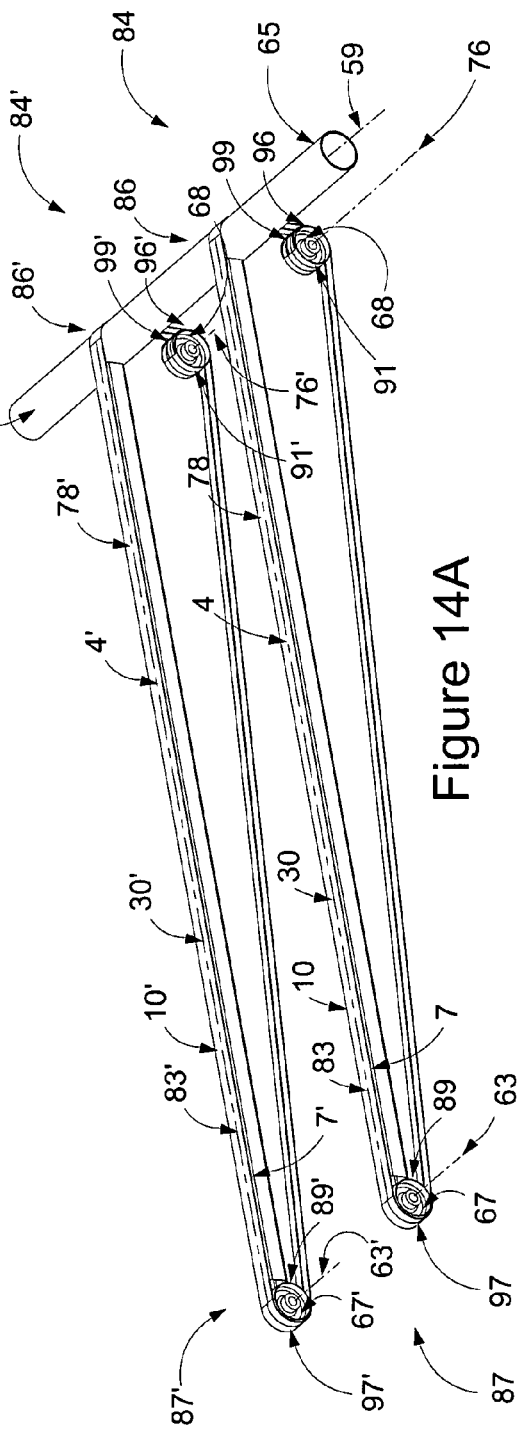

DIVERTING FLAT BELT SUPPORT SYSTEM

BACKGROUND OF THE INVENTION

This invention relates to a flat belt support system configured with an arrangement of a supporting roller, pulleys and a continuous flat belt such that flat belt may be driven by a driving roller and a belt path is created and controlled by articulating the support pulleys relative to the driving roller such that the flat belt will naturally tend to stay roughly centered on the pulleys while traveling about the belt path created. A variety of configurations using these components are common practice in many applications where the centerline of the belt path is essentially coplanar in a plane which is normal to the axis of the driving roller. However, this invention allows the pulleys to be articulated relative to the roller such that the centerline of the belt path is no longer coplanar. This invention allows objects conveyed by the flat belt to be selectively diverted from the plane normal to the axis of the driving roller. This invention also allows the belt path to move laterally along the axis of the driving roller.

This invention creates an advantage in applications in which it is desirable to have a single or plurality of flat belts being driven by a single driving roller while also needing to articulate each belt path independently to each other by adjusting both the relative spacing between the belts and the skew of the belts from the plane normal to the axis of the drive roller.

There are two very common industrial uses for flat belts as shown on FIG. 5. The first is the transmission of power from one driving rotary shaft to another driven rotary shaft via the use of pulleys and one or more flat belts. The second is for the purpose of conveyance in which one or more flat belts are driven with the intention of transporting another material or objects along the conveyance surface of the flat belting.

This invention is related to a need for conveyance of objects. It can be used in any industry where there is a need to convey objects in a flow direction with the added requirement of needing to laterally shift the conveyed objects relative to a straight flow direction and/or relative to the other objects being conveyed.

While it can be used in a variety of industrial applications, one common application is in the material handling of cardboard/corrugated sheets. In particular, during the production of corrugated flat boxes by a machine known as a Rotary Die Cutter, corrugated flat boxes are produced by converting a large rectangular feed sheet into multiple smaller flat boxes using a die cutting processes. The die boards are attached to a rotating drum and the material is fed through with the die board cutting the large rectangular sheet in both the material flow direction and perpendicular to the material flow direction to produce the multiple smaller flat boxes. These flat boxes qualify as objects which may be conveyed by the conveyance surface.

The term "UPS" is used throughout this patent in reference to the number of flat boxes produced due to cutting in the perpendicular to the material flow direction where as the term "OUTS" will be used in reference to the boxes produced due to cutting in the direction parallel to the material flow direction.

For many years there has been the need to collect these multiple UPS and OUTS of smaller flat boxes as they exit the Rotary Die Cutter and place the boxes into stacks of boxes for further processing downstream. There have been a multitude of stacking machines that have been produced to service this need. One form of sheet stacker is found in U.S. Pat. No. 2,901,250 granted to Martin on Aug. 25, 1959. A second form of sheet stacker is found in U.S. Pat. No. 5,026,249 granted to TEI on Jun. 25, 1991.

One of the challenges of stacking the flat boxes is that during the process of making the stacks of boxes, it is often desired to separate the OUTS laterally as they are conveyed away from the Rotary Die Cutter. This lateral separation keeps the individual flat boxes from becoming interleaved with each other during transport and also allows for dividers to be placed between the individual stacks being produced to improve the integrity of the stacks of boxes. In FIG. 7B, a set of grooved belts referred to as Layboy Arms 53 are arranged in order to create the lateral separation. This need has also been addressed in the following patents: U.S. Pat. No. 3,860,232 granted to Martin on Jan. 14, 1975, U.S. Pat. No. 5,026,249 granted to TEI on Jun. 25, 1991, U.S. Pat. No. 6,000,531 granted to Martin on Dec. 14, 1999, and U.S. Pat. No. 6,427,097 granted to Martin on Jul. 30, 2002.

The usage of round, V-grooved and other grooved type belt conveying means affords the option of creating the laterally skewed belt path in a multiple number of ways since they each can be controlled by the position of the entrance and exit pulleys. These pulleys do not even have to stay in the same plane as the plane defined generally by the centerline of the belt path since the belts are forced to track each pulley with some method of grooving or rim on the pulleys. One form of this method in shown in U.S. Pat. No. 3,860,232 granted to Martin on Jan. 14, 1975

Because of the total width of large industrial machinery including the sheet stackers, it is desirable to be able to skew larger width flat belts which rely on the tracking of their belts back surface as opposed to providing the large number of narrow grooved belts which would be required to support both large and small boxes across the entire width of the sheet stacker.

The prior art includes systems that allow the diversion of flat belts but do so by keeping the entrance velocity plane and exit velocity plane essentially coplanar or parallel, unlike the current invention which allows the exit velocity plane to be both non-coplanar and non-parallel.

U.S. Pat. No. 2,901,250 granted to Martin on Aug. 25, 1959, U.S. Pat. No. 3,860,232 granted to Martin on Jan. 14, 1975, U.S. Pat. No. 5,026,249 granted to TEI on Jun. 25, 1991, U.S. Pat. No. 6,000,531 granted to Martin on Dec. 14, 1999, and U.S. Pat. No. 6,427,097 granted to Martin on Jul. 30, 2002 are hereby incorporated by reference.

SUMMARY OF THE INVENTION

The Diverting Flat Belt Support System of the present invention is a support system configured from rollers and pulleys that create a belt path for a continuous flat belt which can be used for the conveyance of objects. The flat belt conveyance surface has an entrance portion, entrance velocity point, entrance velocity plane, entrance velocity vector and entrance axis of rotation. The conveyance surface has an exit portion, exit velocity point, exit velocity plane, exit velocity vector and entrance axis of rotation. While not required, entrance velocity point and exit velocity point are typically the beginning and end of the entrance portion and exit portion respectively. While not a requirement of the invention, a static conveyance surface support member may be provided to increase conveying capacity. The entrance velocity plane and the exit velocity plane may selectively be changed between coplanar and variable degrees of non-coplanar and non-parallel by articulating the supporting pulleys relative to the rollers.

Another objective of this invention is to allow the flat belt to track the support system properly even when the entrance velocity plane and exit velocity plane are non-coplanar and non-parallel.

Another objective of this invention is to produce a belt path that curves along the conveyance surface such that the objects being conveyed will be gradually shifted laterally.

A further objective of this invention is to allow the entrance velocity plane to be shifted laterally along the associated axis of rotation in order to allow variable spacing when a plurality of flat belts share a common roller.

BRIEF DESCRIPTION OF THE DRAWINGS

FIG. 1A is a side view of a generic pulley and belt path used to define the terms related to a flat belt and grooved belts.

FIG. 1B is a cross-sectional view of a generic flat belt and pulley.

FIG. 1C is a cross-sectional view of a generic irregular flat belt and pulley.

FIG. 1D is a cross-sectional view of a generic V-grooved belt and pulley.

FIG. 1E is a cross-sectional view of a generic round belt and pulley.

FIG. 3A is a perspective view used to define the terms related to a pulley, both crowned pulleys and flat pulleys.

FIG. 3B is a right side elevation view of FIG. 3A used to define the terms related to a pulley, both crowned pulleys and flat pulleys.

FIG. 3C is a cross-sectional view of FIG. 3B used to define the terms related to a crowned pulley.

FIG. 3C' is a cross-sectional detailed view of FIG. 3C used to define the terms related to a crowned pulley.

FIG. 3D is a cross-sectional view of FIG. 3B used to define the terms related to a flat pulley.

FIG. 3D' is a cross-sectional detailed view of FIG. 3D used to define the terms related to a flat pulley.

FIG. 5A is a perspective view used to define conveyance usage of flat belts.

FIG. 5B is a perspective view used to define power transmission usage of flat belts.

FIG. 6A is a top plan view of Rotary Die Cutter used to define the terms related to the production of flat boxes with a Rotary Die Cutter.

FIG. 6B is a perspective view of Rotary Die Cutter cylinders used to define the terms related to the production of flat boxes with a Rotary Die Cutter.

FIG. 7A is a side elevation view of a sheet stacker used to describe why the lateral shifting is required during the making of stacks of boxes.

FIG. 7B is a top plan view of a sheet stacker used to describe why the lateral shifting is required during the making of stacks of boxes.

FIG. 8A is a side elevation view which illustrates the basic elements of the flat belt and most basic support system in side view and isometric view. The articulating system constraining these elements has been removed for clarity.

FIG. 8B is a perspective view which illustrates the basic elements of the flat belt and most basic support system in side view and isometric view. The articulating system constraining these elements has been removed for clarity.

FIG. 8C is a perspective view which enlarges details of FIG. 8B and illustrates the exit elements of the flat belt and most basic support system in side view and isometric view.

FIG. 8D is a perspective view which enlarges details of FIG. 8B and illustrates the entrance elements of the flat belt and most basic support system in side view and isometric view.

FIG. 9A is a side elevation view which illustrates the basic elements of the flat belt and the preferred embodiment of the support system in side view and isometric view. The articulating system constraining these elements has been removed for clarity.

FIG. 9B is a perspective view which illustrates the basic elements of the flat belt and the preferred embodiment of the support system in side view and isometric view. The articulating system constraining these elements has been removed for clarity.

FIG. 9C is a perspective view which enlarges details of FIG. 9B and illustrates the entrance elements of the flat belt and the preferred embodiment of the support system in side view and isometric view.

FIG. 9D is a perspective view which enlarges details of FIG. 9B and illustrates the exit elements of the flat belt and the preferred embodiment of the support system in side view and isometric view.

FIG. 10A is a top plan view which illustrates the conveyance surface when the entrance velocity plane and the exit velocity plane are coplanar.

FIG. 10B is a top plan view which illustrates the conveyance surface when the entrance velocity plane and the exit velocity plane are not coplanar and not parallel

FIG. 12A is a perspective view which illustrates a parallel roller and terms related to the explanation of flat belt tracking tendencies.

FIG. 12B is a top Plan view of FIG. 12A which illustrates a parallel roller and terms related to the explanation of flat belt tracking tendencies.

FIG. 12C is a perspective view which illustrates a taper roller and terms related to the explanation of flat belt tracking tendencies.

FIG. 12D is a top plan view of FIG. 12C which illustrates a taper roller and terms related to the explanation of flat belt tracking tendencies.

FIG. 12E is a perspective view of crowned pulley and flat belt used to define the terms related to the explanation of flat belt tracking tendencies.

FIG. 12F is a cross section view of FIG. 12E used to define the terms related to the explanation of flat belt tracking tendencies.

FIG. 12F' is a cross section view detail of FIG. 12F showing belt with theoretical gap.

FIG. 12F" is a cross section view detail of FIG. 12F showing belt conforming to pulley.

FIG. 14A is a perspective view which illustrates the basic elements of a plurality of flat belts and a plurality of the most basic support system.

FIG. 14B is a side elevation view which illustrates the basic elements of a plurality of flat belts and a plurality of the most basic support system.

DETAILED DESCRIPTION OF THE INVENTION

Figure 2B:
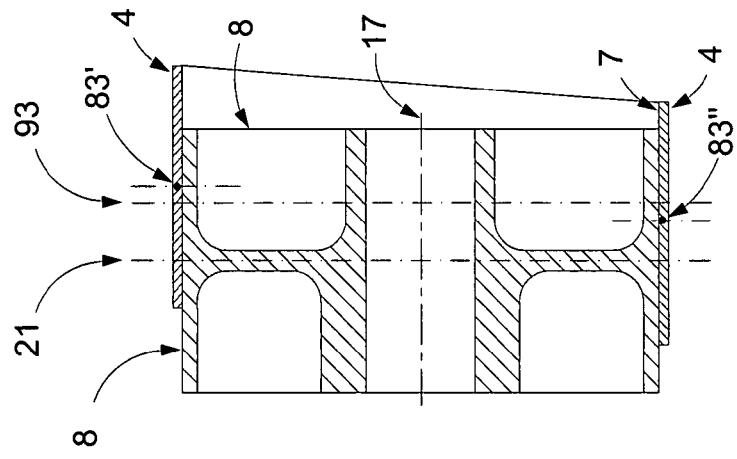
FIG. 2B is a cross-sectional view used to define the terms related to average contact centerline belt path.

The following terms are defined to provide clarity throughout this patent.

The term flat belt 4 is used throughout this patent to refer to the type of belt that has its tracking controlled by the belt's back surface 7 and the support system 84. This is unlike a class of belts which may be referred to as grooved belts 5, 6 shown in FIG. 1 illustrated in a generic configuration 1 with two generic pulleys 2, 3. The tracking of grooved belts 5, 6 is controlled by the belts being constrained by contact force with the sides 9, 9' of the belt. This is typically achieved with grooves in the pulleys 8', 8" and typical examples include V-Grooved Belting 5 and Round-Grooved Belting 6. Thus, while the term flat belt 4 may describe a belt with a parallel cover 10 and back surface 7, it would also include any belt 13 with a non-flat back surface 11 and/or a non-flat cover 12 as one example provided the tracking is still controlled by the belt's back surface 11.

The term centerline belt path 83 is used throughout this patent and is defined in FIGS. 1A-1E as the continuous path created by the belt's center of cross sectional area axis.

The term average contact centerline belt path 93 is used throughout this patent and is defined in FIG. 2B as the average lateral position of the centerline belt path 83 along the rotational axis 17 where the back 7 of the flat belt 4 is in contact with the surface 8.

The term support system 84, 84' is used throughout this patent and is defined shown FIGS. 8A-8D and FIGS. 9A-9D as only those elements that directly affect the belt path 83 of the flat belt 4.

Figure 13B:
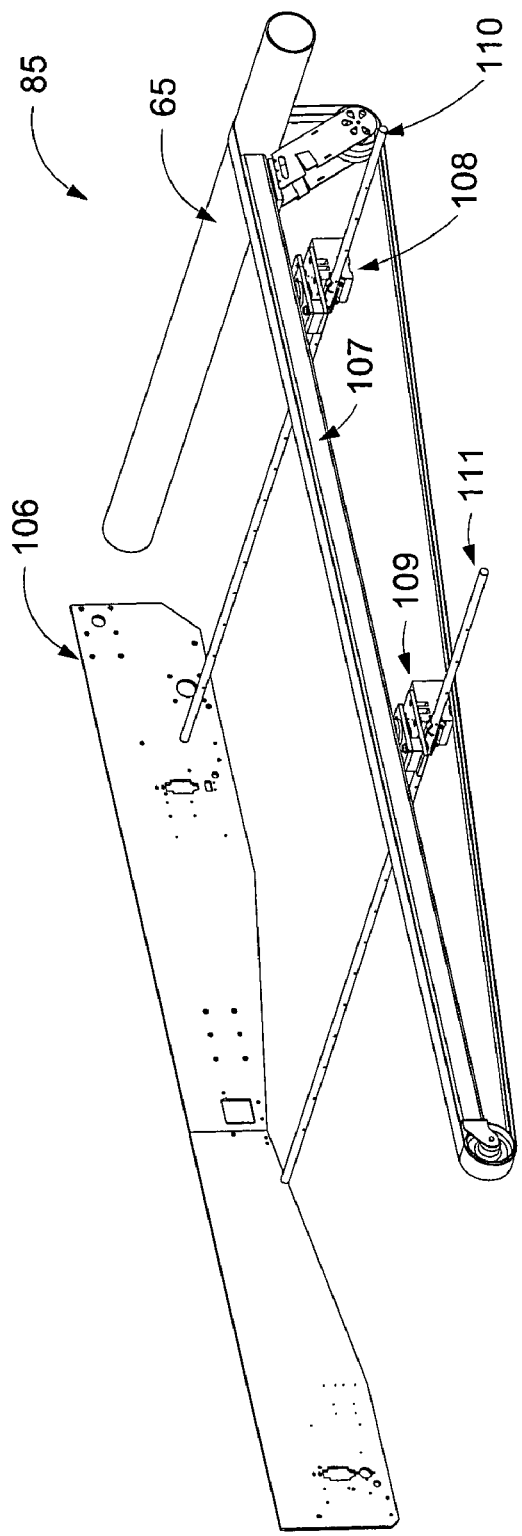
FIG. 13B is a perspective view which illustrates the basics of an articulation system.
Figure 13A:
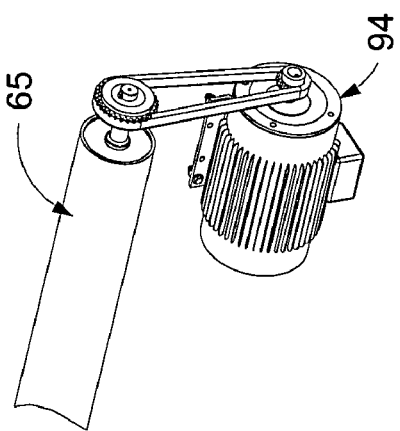
FIG. 13A is a perspective view of torque source for rollers
Figure 15B:
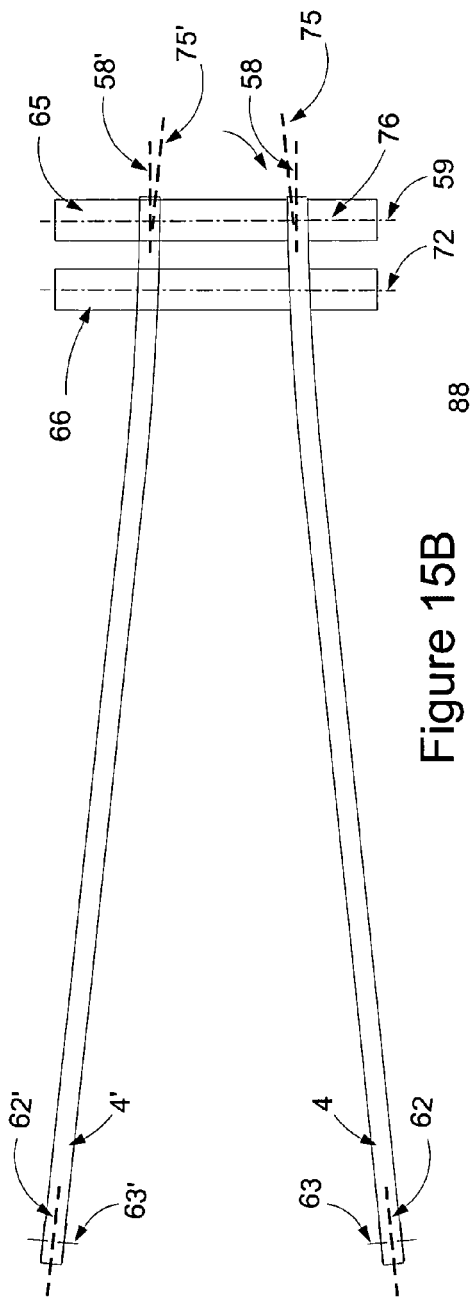
FIG. 15B is a top plan view which illustrates the basic elements of a plurality of flat belts and a plurality of the preferred embodiment support system
Figure 15A:
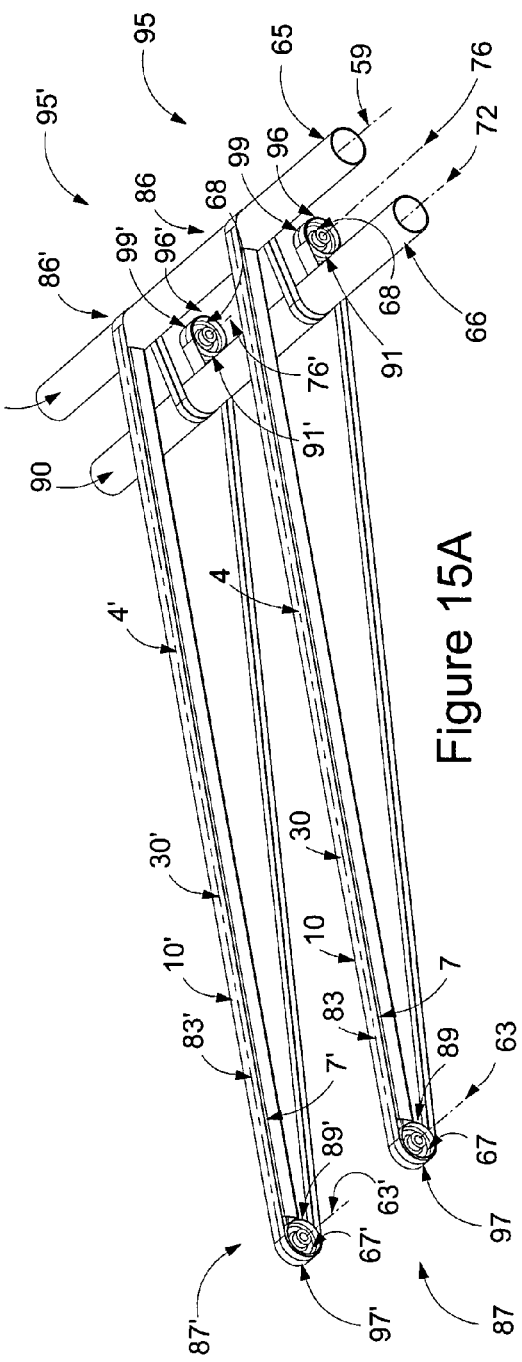
FIG. 15A is a perspective view which illustrates the basic elements of a plurality of flat belts and a plurality of the preferred embodiment support system.
Figure 16:
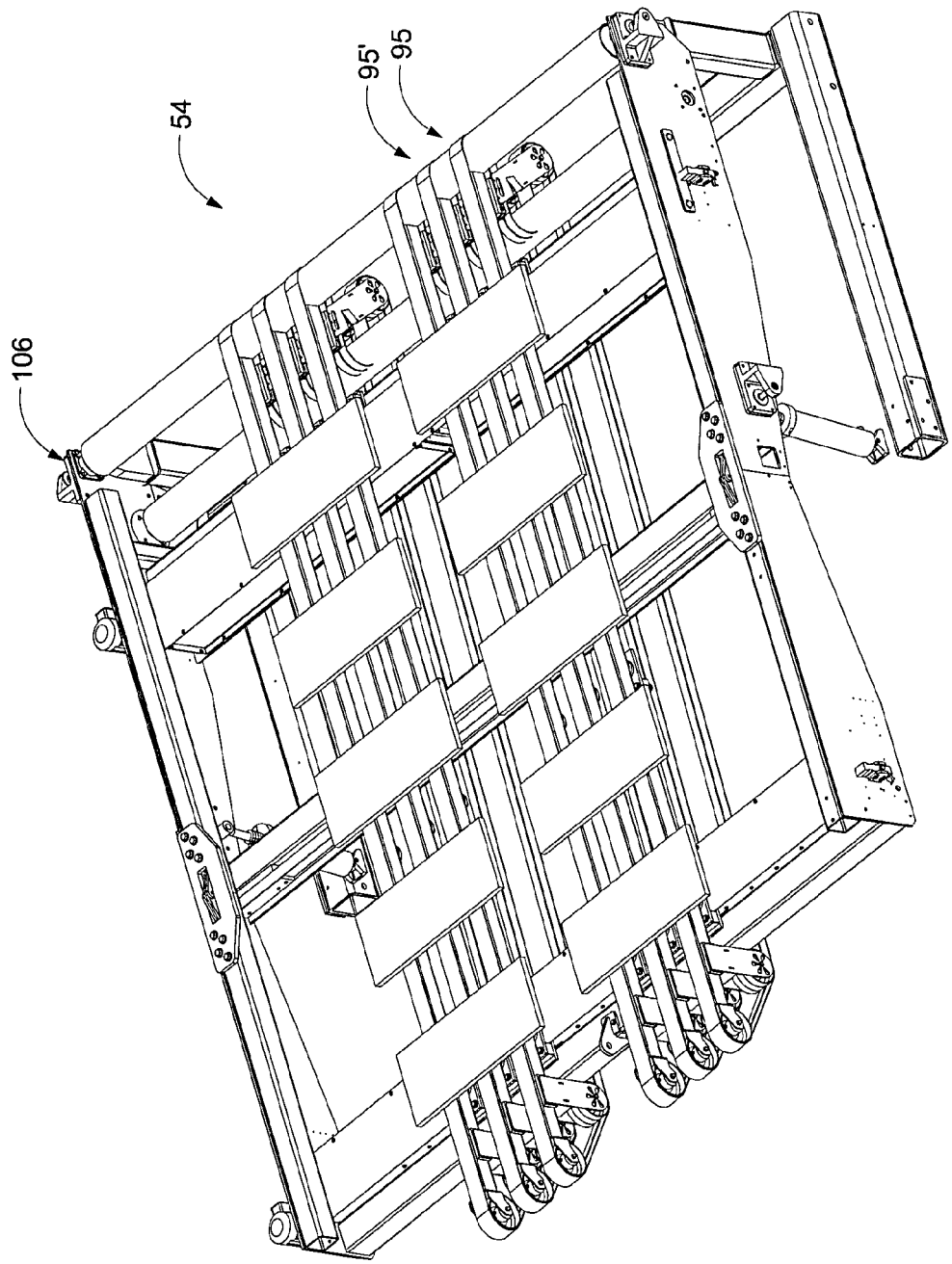
FIG. 16 is a perspective view which illustrates a complete sheet stacker machine with the integration of a plurality of flat belts and a plurality of the preferred embodiment support system.

The term articulation system 85 is used throughout this patent and is defined in FIG. 13 as the elements that interconnect the elements of the support system 84, 84' and allow the desired movement of the support system 84, 84'.

Figure 2A:
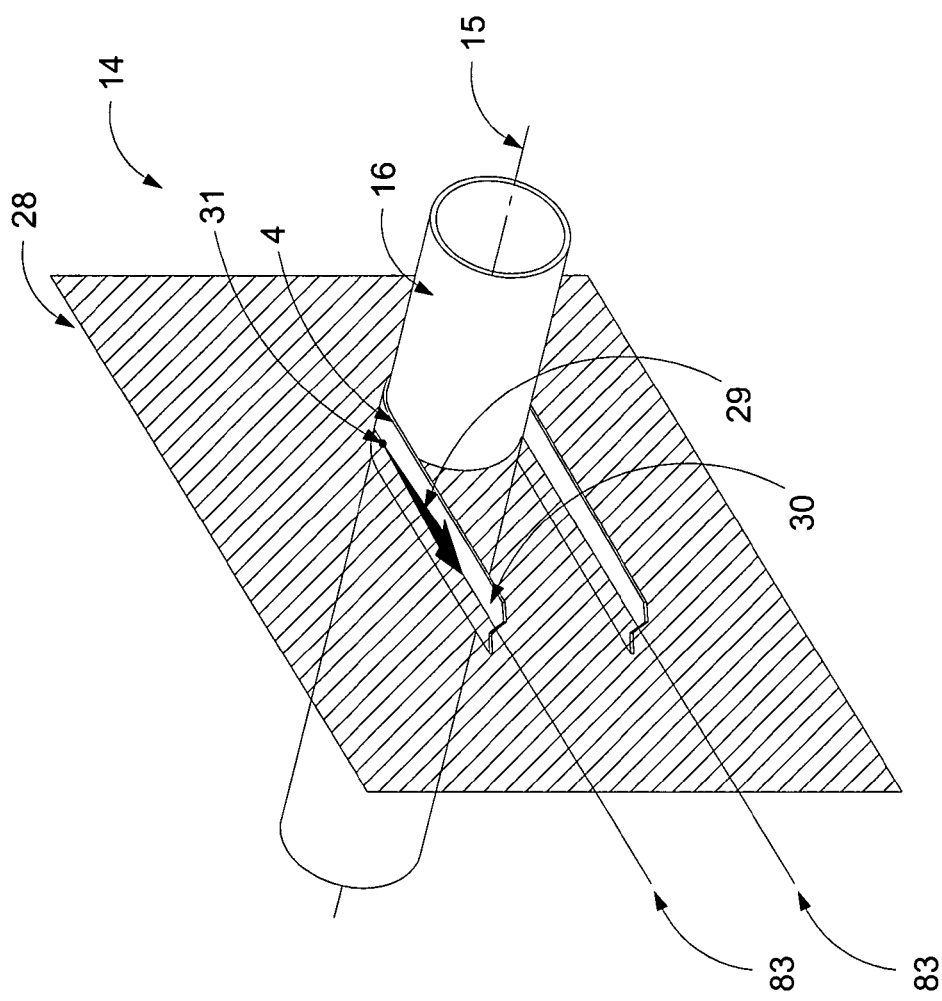
FIG. 2A is a perspective view used to define the terms related to a roller.
Figure 4A:
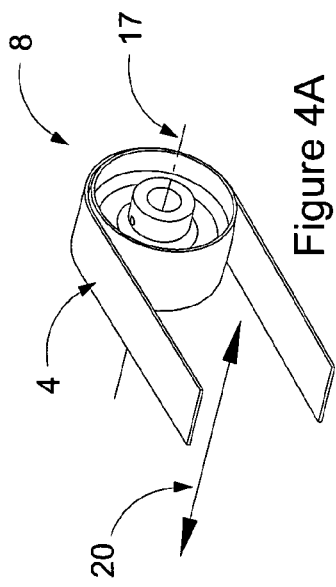
FIG. 4A is a perspective view used to define the terms related to a flat belt tracking.
Figure 4B:
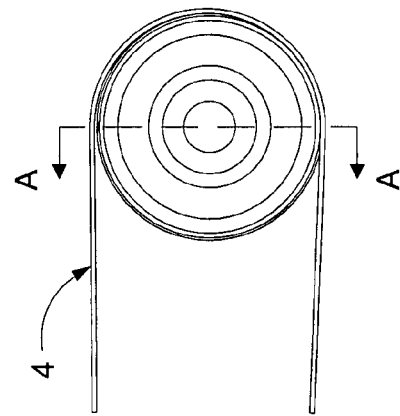
FIG. 4B is a right side elevation view of FIG. 4A used to define the terms related to a flat belt tracking.
Figure 4D:
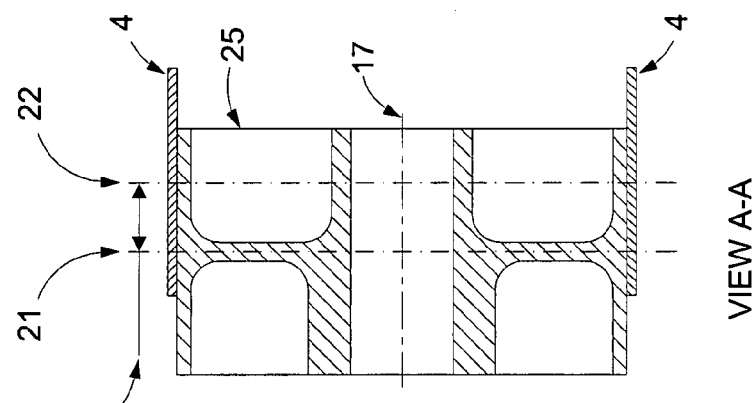
FIG. 4D is a cross-sectional view of FIG. 4B used to define the terms related to a flat belt tracking.
Figure 4C:
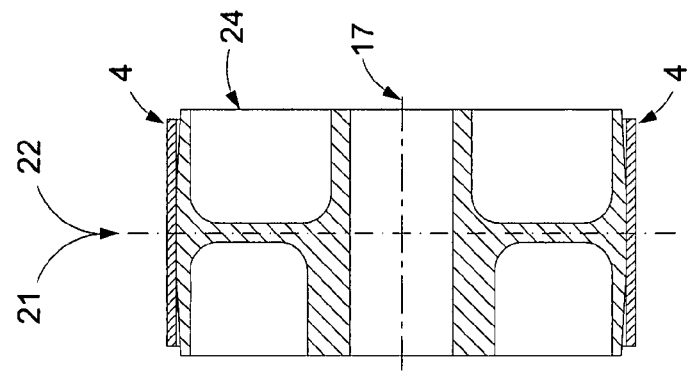
FIG. 4C is a cross-sectional view of FIG. 4B used to define the terms related to a flat belt tracking.
Figure 11:
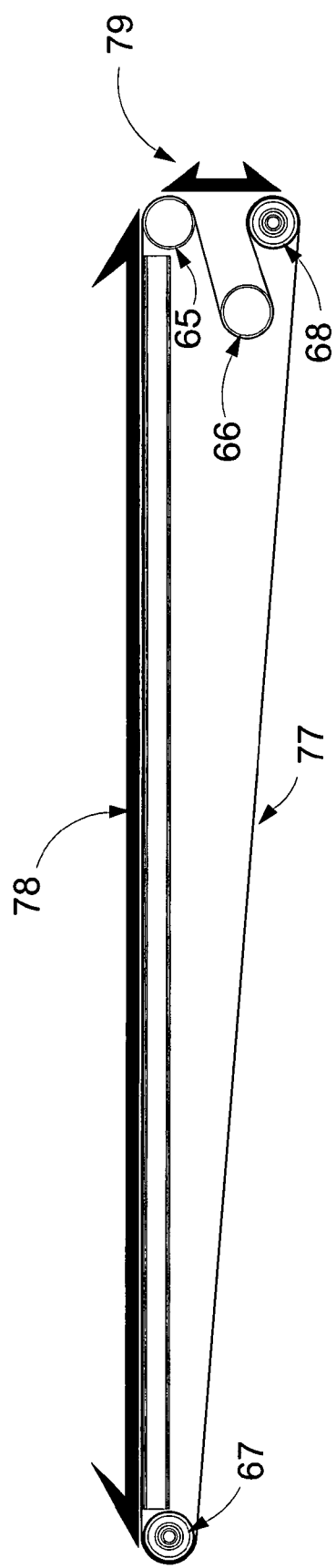
FIG. 11 is a side elevation view which illustrates the tangent surface vectors of this invention.

The term roller 14 is used throughout this patent and is defined in FIG. 2A as a parallel cylindrical object with a center rotational axis 15 and is substantially wider than the flat belt 4 which may allow for a plurality of flat belts 4', 4", . . . to be in contact directly with the surface 16 of the roller 14. In the preferred embodiment a roller 14 would have parallel surfaces 16 but this is not always required.

The term conveyance surface 30 is used throughout this patent and is defined in FIG. 2A as the cover 10 side of the flat belt 4 upon which objects may be conveyed by the motion flat belt 4 along the flat belt path 83.

The term velocity point 31 is used throughout this patent and is defined in FIG. 2A as the point on the centerline belt path 83 where the conveyance surface 30 begins or ends contact with a roller or pulley.

The term velocity plane 28 is used throughout this patent and is defined in FIGS. 2A-2B as a plane perpendicular to a central rotational axis 15, 17 which intersects the average contact centerline belt path 93.

The term velocity vector 29 is used throughout this patent and is defined in FIG. 2A as a vector beginning at the velocity point 31. The magnitude of the velocity vector 29 is based on the angular velocity and geometry of the associated roller or pulley as well as the geometry of the flat belt 4. The direction of the velocity vector is along the intersection of flat belt cover 10 and the velocity plane 28.

The term pulley 8 is used throughout this patent and is defined in FIGS. 3A-3D as generally cylindrical shape object with a center rotation axis 17 and is similar in width to the flat belt 4 and is in contact with a single flat belt 4. If the outer diameter of the pulley 18" is essentially the same across the length of the pulley, it will be referred to as a "flat pulley" 25. If the outer diameter of the pulley 18' is variable across the length of the cylinder such that the outside diameter in the center of the cylinder 19 is larger than the outside diameter at the ends of the cylinder 19', it will be referred to as a "crowned pulley" 24.

The term "tracking" is used throughout this patent and is defined in FIG. 4A-4D as maintaining the lateral position 20 of the center plane 22 of the flat belt 4 where it contacts a pulley 24, 25 relative to center plane 21 of the pulley 24, 25 such that there is little or no offset 23. That is, a flat belt properly "tracking" a pulley 24 will stay on the pulley near the center of the pulley where as a flat belt that is not "tracking" a pulley 25 will run off center of the pulley or completely fall off the edge of the pulley. Note that while crowned pulleys 24 do tend to track better than flat pulleys 25 there are many other support variations that effect tracking and FIG. 4 is illustrated as an example of tracking only.

Flat belts 4 have been used for many years in industrial applications. This invention relates to a flat belt 4 in the application of conveyance 33. A flat belt 4 is often connected to itself to form a continuous flat belt. Since the belting material is flexible it requires a support system 84 to constrain the flat belt 4 to follow a desired belt path 83. The support system 84 is typically created from rollers 14 and pulleys 8. Optionally, additional other static support structures 64 may be included upon which the back 7 and/or cover 10 of the flat belt 4 may slide for extra support to avoid sagging due to gravity and/or to support objects 38 being conveyed. Since the support system 84 is only those elements that directly affect the belt path 83 of the flat belt 4, an additional articulation system 85 is required in order to interconnect the elements of the support system 84 and allow the desired movement of the support system 84. The configuration of the support system 84 and defining the appropriate articulation constraints of the support system 84 is the primary focus of the invention. The articulation system 85, while being required and described herein, can be accomplished in a multitude of similar ways by those skilled in the art.

For the purpose of this patent, a flat belt 4 is defined as the type of belt having a back 7, an outer cover 10 and a centerline belt path 83 that has its tracking controlled by the belt's back surface 7 and the support system 84.

Since a flat belt 4 is defined as the type of belt having a back 7, an outer cover 10 and a centerline belt path 83 that has its tracking controlled by the belt's back surface 7 and the support system 84, the support system 84 must maintain this proper tracking characteristic while being articulated. To understand why the solutions claimed work it is important to understand the basic physics behind flat belt tracking. As shown in FIGS. 12A and 12B, when a flat belt 4 is traveling around any generally cylindrical object with parallel surfaces such as a pulley 8 or roller 14, the belt surface contact will naturally tend to track towards a direction 100 perpendicular to the surface of the contacting support surface and the back 7 of the flat belt 4. In the case of the flat belt 4 on the parallel roller 14 shown in FIG. 12A, the flat belt 4 will not have a tendency to shift laterally. Where as, in the case of a tapered roller 92 shown in FIGS. 12C and 12D, the flat belt 4 will have a tendency to shift in the direction 101 perpendicular to the surface, thus in this case the centerline belt path 83 will gradually track towards the large end of the tapered roller 92. This is the basic principle behind a crowned pulley 24 as shown in FIGS. 3C, 3C', 12E, 12F', 12F" and 12F'". Since a crowned pulley has an outer diameter of the pulley 18' which is variable across the length of the cylinder such that the outside diameter in the center of the cylinder 19 is larger than the outside diameter at the ends of the cylinder 19', and typically is symmetrical. As a result, even though theoretically there is a gap as shown in FIG. 12F', in practice the flexible material of the flat belt 4 will conform to the crowned pulley's surface. The result is that there are opposing laterally shifting tendencies 102, 103. The strength of these tendencies is generally a function of how much contact surface area exists between the flat belt 4 and the crowned surfaces 104, 105. The more contact surface area, the larger the tendency. As a result, should the flat belt 4 laterally shift slightly such that contact surface area 104 is larger than contact surface area 105, then the shifting tendency 102 which is associated with contact surface area 104 would grow relative to the shifting tendency 103 which is associated with contact surface area 105. This imbalance in tendencies 102, 103 will cause the flat belt to shift back towards the middle thus giving the crowned pulley 24 the desired characteristic of keeping a flat belt 4 properly tracking to the center of the crowned pulley. It is important to note that there are a variety of crowned surfaces, including but not limited to a taper with and without a flat area in the middle and a multitude of curved surfaces. It is also important to note that the belting material and other system parameters can also affect the way a belt path tracks.

As the purpose of this flat belt 4 is the application of conveyance 33, the flat belt 4 may convey objects 38 from the entrance portion 86 of a conveyance surface 30 proximate a first roller 65 to the exit portion 87 of the conveyance surface 30 proximate a first pulley 67.

In the most basic form of the invention the support system 84 has three rotational elements. They are a first roller 65, a first pulley 67 and a second pulley 68.

The first roller 65 has a rotational axis 59, an outer surface 88 supporting the back 7 of the flat belt 4 and an entrance velocity plane 58 perpendicular to the rotational axis 59 which intersects the first roller average contact centerline belt path 96 which is the average lateral position of the centerline belt path 83 along the rotational axis 59 where the back 7 of the flat belt 4 is in contact with the first roller outer surface 88.

The first pulley 67 has a rotational axis 63 and an outer surface 89 supporting the back 7 of the flat belt 4 with an exit velocity plane 62 perpendicular to the rotational axis 63 which intersects the first pulley average contact centerline belt path 97 which is the average lateral position of the centerline belt path 83 along the rotational axis 63 where the back 7 of the flat belt 4 is in contact with the first pulley outer surface 89.

The second pulley 68 has a rotational axis 76 and an outer surface 91 supporting the back 7 of the flat belt 4 with a return velocity plane 75 perpendicular to the rotational axis 76 which intersects the second pulley average contact centerline belt path 99 which is the average lateral position of the centerline belt path 83 along the rotational axis 76 where the back 7 of the flat belt 4 is in contact with the second pulley outer surface 91.

The flat belt 4 and the most basic form of a support system 84 includes: the flat belt 4 has an upper conveyance surface 30 where the conveyance surface 30 has an entrance portion 86 and an entrance velocity plane 58 proximate the first roller 65, the conveyance surface 30 has an exit portion 87 with an exit velocity plane 62 proximate the first pulley 67, the first pulley 67 deflects the flat belt 4 from the entrance velocity plane 58 to the exit velocity plane 62, the entrance velocity plane 58 and the exit velocity plane 62 are not coplanar and not parallel and the return velocity plane 75 is substantially coplanar with the exit velocity plane 62. With the flat belt 4 tracking the second pulley 68, the lateral positioning 47 of the second pulley 68 controls the lateral positioning of the entrance velocity plane 58. With the flat belt 4 tracking the first pulley 67 and thereby controlling the position of the exit velocity plane 62, the exit velocity plane 62 is adjustable to any selected degree of not coplanar and not parallel to the entrance velocity plane 61 by adjusting the position of the first pulley 67 and simultaneously adjusting the second pulley 68 in order to keep the return velocity plane 75 substantially coplanar with the exit velocity plane 62. The first roller 65 is substantially wider than the flat belt 4 and thus the second pulley 68 can controlled the lateral position of the entrance velocity plane 58. However, the first roller 65 must to rotating at a minimum speed in order to allow the belt to laterally shift thus the entrance velocity plane 61 is laterally 47 movable along the rotational axis 59 of the first roller 65 while rotating the first roller 65 to permit the flat belt 4 to maintain proper tracking of the second pulley 68. In the preferred embodiment, the first pulley 67 and second pulley 68 are crowned 24 to improve the ability of the flat belt 4 to track the first and second pulleys 67, 68. In the preferred embodiment the maximum degree to which the entrance velocity plane 58 and the exit velocity plane 62 can be not coplanar and not parallel can be increased while still maintaining proper tracking if the tracking tendencies of the first roller are not allowed to affect the tracking tendencies of the second pulley which can be minimized if spatial relationship exists between the first roller 65, first pulley 67 and second pulley 68 such that the tangent surface vector 78 created by the first roller 65 and the first pulley 67 is substantially perpendicular to the tangent surface vector 79 created by the first roller 65 and the second pulley 68. In order to convey objects 38, in this most basic form of a support system 84 a torque source 94 is operatively connected to first roller 65 to provide driving power for the flat belt 4 through friction between the back 7 of the flat belt 4 and the outer surface 88 of the first roller 65.

The flat belt 4 and the preferred embodiment of a support system 85 would have additional angular belt contract surface with the various pulleys and rollers and it is often desirable to drive the flat belt 4 with a torque source 94 such that the cover 10 of the flat belt 4 is being driven since the cover 10 typically is of higher friction than the belt back 4. In order to achieve this preferred embodiment of a support system 85 a second roller 66 having a rotational axis 72 and an outer surface 90 is positioned between the second pulley 68 and the first roller 65, with the second roller rotational axis 72 parallel to the first roller rotational axis 59 such that the cover 10 of the flat belt contacts the surface 90 of the second roller 66 which increases the amount of surface contact between the first roller surface 88 and the back 7 of the flat belt 4 and increases the amount of surface contact between the second pulley surface 91 and the back 7 of the flat belt 4. A torque source 94 is operatively connected to the second roller 66 to provide driving power for the flat belt 4 through friction between the cover 10 of the flat belt 4 and the outer surface 90 of the second roller 66. In both support embodiments 84, 85, the conveyance surface 30 conveys objects 38 from the entrance portion 86 proximate the first roller 65 to the exit portion 87 proximate the first pulley 67. In applying this invention to the corrugated industry, in particular the production of flat boxes 41 by a die cutter 42, the conveyed objects 38 are flat boxes 41.

As the purpose of a plurality of flat belts 4, 4' is the application of conveyance 33, each of the plurality of flat belts 4, 4' may convey objects 38 from the entrance portion 86, 86' of a conveyance surface 30, 30' proximate a first roller 65 to the exit portion 87, 87' of the conveyance surface 30 proximate each associated first pulley 67.

In the most basic form of the invention with a plurality of flat belts 4, 4' for each support systems 84, 84' there is one roller common to the plurality of flat belts 4, 4' and support systems 84, 84' and a plurality of first pulleys 67, 67' and second pulleys 68, 68' as elements in each of the support systems 84, 84'.

The first roller 65 common to the plurality of flat belts 4, 4' and support systems 84, 84' has a rotational axis 59, an outer surface 88 supporting the back 7, 7' of the flat belt 4, 4' and an entrance velocity plane 58, 58' perpendicular to the rotational axis 59 which intersects the first roller average contact centerline belt path 96, 96' which is the average lateral position of the centerline belt path 83, 83' along the rotational axis 59 where the back 7, 7' of the flat belt 4, 4' is in contact with the first roller outer surface 88.

Each first pulley 67, 67' has a rotational axis 63, 63' and an outer surface 89, 89' supporting the back 7, 7' of the flat belt 4, 4' with an exit velocity plane 62, 62' perpendicular to the rotational axis 63, 63' which intersects the first pulley average contact centerline belt path 97, 97' which is the average lateral position of the centerline belt path 83, 83' along the rotational axis 63, 63' where the back 7, 7' of the flat belt 4, 4' is in contact with the first pulley outer surface 89, 89'.

Each second pulley 68, 68' has a rotational axis 76, 76' and an outer surface 91, 91' supporting the back 7, 7' of the flat belt 4, 4' with a return velocity plane 75, 75' perpendicular to the rotational axis 76, 76' which intersects the second pulley average contact centerline belt path 99, 99' which is the average lateral position of the centerline belt path 83, 83' along the rotational axis 76, 76' where the back 7, 7' of the flat belt 4, 4' is in contact with the second pulley outer surface 91, 91'.

In the most basic form of the invention with a plurality of flat belts 4, 4' each flat belt 4, 4' and associated support systems 84, 84' includes: the flat belt 4, 4' having an upper conveyance surface 30, 30' where the conveyance surface 30, 30' has an entrance portion 86, 86' and an entrance velocity plane 58, 58' proximate the first roller 65, the conveyance surface 30, 30' has an exit portion 87, 87' with an exit velocity plane 62, 62' proximate the first pulley 67, 67', the first pulley 67, 67' deflects the flat belt 4, 4' from the entrance velocity plane 58, 58' to the exit velocity plane 62, the entrance velocity plane 58 and the exit velocity plane 62, 62' which are not coplanar and not parallel and the return velocity plane 75, 75' is substantially coplanar with the exit velocity plane 62, 62'. With the flat belt 4, 4' tracking the second pulley 68, 68', the lateral positioning 47 of the second pulley 68, 68' controls the lateral positioning of the entrance velocity plane 58, 58'. With the flat belt 4, 4' tracking the first pulley 67, 67' and thereby controlling the position of the exit velocity plane 62, 62', the exit velocity plane 62, 62' is adjustable to any selected degree of not coplanar and not parallel to the entrance velocity plane 61, 61' by adjusting the position of the first pulley 67, 67' and simultaneously adjusting each associated second pulley 68 in order to keep each associated return velocity plane 75, 75' substantially coplanar with each associated exit velocity plane 62, 62'. The first roller 65 is substantially wider than each flat belt 4, 4' and thus the second pulley 68, 68' can controlled the lateral position of the entrance velocity plane 58, 58'. However, the first roller 65 must to rotating at a minimum speed in order to allow the flat belts 4, 4' to laterally shift thus each associated entrance velocity plane 61, 61' is laterally 47 movable along the rotational axis 59 of the first roller 65 while rotating the first roller 65 to permit each associated flat belt 4, 4' to maintain proper tracking of each associated second pulley 68, 68'. In the preferred embodiment, the plurality of first pulley 67 and plurality of second pulley 68 are crowned 24 to improve the ability of the plurality of flat belt 4 to track each associated first pulley 67, 67' and second pulleys 68, 68'. In the preferred embodiment the maximum degree to which each entrance velocity plane 58, 58' and each associated exit velocity plane 62, 62' can be not coplanar and not parallel can be increased while still maintaining proper tracking if the tracking tendencies of the first roller 58 are not allowed to affect the tracking tendencies of the second pulley 68, 68' which can be minimized if spatial relationship exists between the first roller 65, each first pulley 67, 67' and each second pulley 68, 68' is such that the each associated tangent surface vector 78, 78' created by the first roller 65 and each first pulley 67, 67' is substantially perpendicular to the tangent surface vector 79, 79' created by the first roller 65 and each associated second pulley 68, 68'. In order to convey objects 38, in this the most basic form of the invention with a plurality of flat belts 4, 4' each flat belt 4, 4' and associated support systems 84, 84' a torque source 94 is operatively connected to first roller 65 to provide driving power for each flat belts 4, 4' through friction between the back 7, 7 of the flat belt 4, 4 and the outer surface 88 of the first roller 65.

In the preferred each flat belt 4 and support system 85, 85' has additional angular belt contact surface with the various pulleys and rollers and it is often desirable to drive the flat belt 4, 4' with a torque source 94 such that the cover 10, 10' of the flat belt 4, 4' is being driven since the cover 10, 10' typically is of higher friction than the belt back 4, 4'. In order to achieve this preferred embodiment of a support system 85, 85' a second roller 66 having a rotational axis 72 and an outer surface 90 is positioned between the second pulleys 68, 68' and the first roller 65, with the second roller rotational axis 72 parallel to the first roller rotational axis 59 such that the cover 10 of the flat belt contacts the surface 90 of the second roller 66 which increases the amount of surface contact between the first roller surface 88 and the back 7, 7' of the flat belt 4, 4' and increases the amount of surface contact between the plurality of each second pulley surface 91, 91' and the back 7, 7' of the flat belt 4, 4'. A torque source 94 is operatively connected to the second roller 66 to provide driving power for each flat belt 4, 4' through friction between the cover 10, 10' of each flat belt 4, 4' and the outer surface 90 of the second roller 66. In both support embodiments 94, 95, the conveyance surface 30 conveys objects 38 from the entrance portion 86, 86' proximate the first roller 65 to the exit portion 87, 87' proximate the first pulley 67. In applying this invention to the corrugated industry, in particular the production of flat boxes 41 by a die cutter 42, the conveyed objects 38 are flat boxes 41.

The plurality of flat belts 4, 4' and support systems 84, 84' or the preferred embodiment plurality of flat belts 4, 4' and support systems 95, 95' have a direct application when integrated into a sheet stacking machine 54 which conveys flat boxes 41 for the purpose of producing stacks of boxes 50.

An articulation system 85 is required to articulate the elements of the support system 84, 84', 95, 95' There are a multitude of means by which this can be easily accomplished by those skilled in the art with the following example described for completeness. In the simplest form, the rollers and pulleys would be rigidly mounted on framework with fixturing such that each item could be manually positioned relative to each other.

In an additional, for sophisticated example, is becomes clear that elements included in the basic support system 84, 84' and the preferred embodiment support system 95, 95' are only different in the added element of a second roller 66 for the preferred embodiment. Since the second roller 66 can be fixed to the frame 106 of a sheet stacker 54 as an example, the means for articulating the plurality of first pulleys 65, 65' and second pulleys 67, 67' will apply to all support systems 84, 84', 95, 95'.

A simple articulation system would include the following for each flat belt 4, 4' and associated first pulley 65, 65' and second pulley 67, 67'. A substantially rigid belt arm 107 would operatively connect each first pulley 65, 65' and second pulley 67, 67'. These belt arms 107, 107' would be pivotably connected to an entrance slider block 108, 108' and supported by exit slider block 109, 109'. This slider block 108, 108', 109, 109' would be able to move selectively along entrance linear rail 110 and exit linear rail 111 respectively. This results in the belt arm pivoting about pivot point 80. By implementing one of a multitude of means to control and position these slider blocks 108, 108', 109, 109', the articulation of the support systems 84, 84', 95, 95' may be achieved.

We claim:

1. A flat belt (4) and support system (84) for a flat belt (4) for conveying objects (38) from the entrance portion (86) of a conveyance surface (30) proximate a first roller (65) to the exit portion (87) of the conveyance surface (30) proximate a first pulley (67), the flat belt (4) and support system (84) comprising:
   a. a flat belt (4) having a back (7), an outer cover (10) and a centerline belt path (83);
   b. a first roller (65) having a rotational axis (59), an outer surface (88) supporting the back (7) of the flat belt (4) and an entrance velocity plane (58) perpendicular to the rotational axis (59) which intersects the first roller average contact centerline belt path (96) which is the average lateral position of the centerline belt path (83) along the rotational axis (59) where the back (7) of the flat belt (4) is in contact with the first roller outer surface (88);
   c. a first pulley (67) having a rotational axis (63) and an outer surface (89) supporting the back (7) of the flat belt (4) with an exit velocity plane (62) perpendicular to the rotational axis (63) which intersects the first pulley average contact centerline belt path (97) which is the average lateral position of the centerline belt path (83) along the rotational axis (63) where the back (7) of the flat belt (4) is in contact with the first pulley outer surface (89); and
   d. a second pulley (68) having a rotational axis (76) and an outer surface (91) supporting the back (7) of the flat belt (4) with a return velocity plane (75) perpendicular to the rotational axis (76) which intersects the second pulley average contact centerline belt path (99) which is the average lateral position of the centerline belt path (83) along the rotational axis (76) where the back (7) of the flat belt (4) is in contact with the second pulley outer surface (91), wherein:
      i. the flat belt (4) has an upper conveyance surface (30);
      ii. the conveyance surface (30) has an entrance portion (86) and an entrance velocity plane (58) proximate the first roller (65);
      iii. the conveyance surface (30) has an exit portion (87), and an exit velocity plane (62) proximate the first pulley (67);
      iv. the first pulley (67) deflects the flat belt (4) from the entrance velocity plane (58) to the exit velocity plane (62);
      v. the entrance velocity plane (58) and the exit velocity plane (62) are not coplanar and not parallel; and
      vi. the return velocity plane (75) is substantially coplanar with the exit velocity plane (62).

2. The flat belt (4) and support system (84) of claim 1, wherein the lateral positioning (47) of the second pulley (68) controls the lateral positioning of the entrance velocity plane (58).

3. The flat belt (4) and support system (84) of claim 1, wherein the exit velocity plane (62) is adjustable to any selected degree of not coplanar and not parallel to the entrance velocity plane (58) by adjusting the position of the first pulley (67) and simultaneously adjusting the second pulley (68) in order to keep the return velocity plane (75) substantially coplanar with the exit velocity plane (62).

4. The flat belt (4) and support system (84) of claim 1, wherein the entrance velocity plane (58) is laterally (47) movable along the rotational axis (59) of the first roller (65) while rotating the first roller (65) to permit the flat belt (4) to maintain proper tracking of the second pulley (68).

5. The flat belt (4) and support system (84) of claim 1, wherein the first pulley (67) and second pulley (68) are crowned (24) to improve the ability of the flat belt (4) to track the first and second pulleys (67, 68).

6. The flat belt (4) and support system (84) of claim 1, wherein a spatial relationship exists between the first roller (65), first pulley (67) and second pulley (68) such that the tangent surface vector (78) created by the first roller (65) and the first pulley (67) is substantially perpendicular to the tangent surface vector (79) created by the first roller (65) and the second pulley (68).

7. The flat belt (4) and support system (84) of claim 1, wherein a torque source (94) is operatively connected to the first roller (65) to provide driving power for the flat belt (4) through friction between the back (7) of the flat belt (4) and the outer surface (88) of the first roller (65).

8. The flat belt (4) and support system (84') of claim 1, wherein a second roller (66) having a rotational axis (72) and an outer surface (90) is positioned between the second pulley (68) and the first roller (65), with the second roller rotational axis (72) parallel to the first roller rotational axis (59) such that the cover (10) of the flat belt (4) contacts the surface (90) of the second roller (66) which increases the amount of surface contact between the first roller surface (88) and the back (7) of the flat belt (4) and increases the amount of surface contact between the second pulley outer surface (91) and the back (7) of the flat belt (4).

9. The flat belt (4) and support system (95) of claim 8, wherein a torque source (94) is operatively connected to the second roller (66) to provide driving power for the flat belt (4) through friction between the cover (10) of the flat belt (4) and the outer surface (90) of the second roller (66).

10. The flat belt (4) and support system (95) of claim 1, wherein the conveyance surface (30) conveys objects (38) from the entrance portion (86) proximate the first roller (65) to the exit portion (87) proximate the first pulley (67).

11. The flat belt (4) and support system (84) of claim 10, wherein the conveyed objects (38) are flat boxes (41).

12. A plurality of flat belts (4, 4') and support systems (84, 84') for the plurality of flat belts (4,4') each of the plurality of flat belts being for conveying objects (38) from the entrance portion (86, 86') of a conveyance surface (30, 30') proximate a first roller (65) to the exit portion (87, 87') of the conveyance surface (30, 30') proximate each associated first pulley (67, 67'), each of the plurality of flat belts (4, 4') and support systems (84, 84') comprising:
  a. a flat belt (4, 4') having a back (7, 7'), an outer cover (10, 10') and a centerline belt path (83, 83');
  b. a first roller (65) common to the plurality of flat belts (4, 4') and support systems (84, 84') having a rotational axis (59), an outer surface (88) supporting the back (7, 7') of the flat belt (4, 4') and an entrance velocity plane (58, 58') perpendicular to the rotational axis (59) which intersects the first roller average contact centerline belt path (96, 96') which is the average lateral position of the centerline belt path (83, 83') along the rotational axis (59) where the back (7, 7') of the flat belt (4, 4') is in contact with the first roller outer surface (88);
  c. a first pulley (67, 67') having a rotational axis (63, 63') and an outer surface (89, 89') supporting the back (7, 7') of the flat belt (4, 4') with an exit velocity plane (62, 62') perpendicular to the rotational axis (63, 63') which intersects the first pulley average contact centerline belt path (97, 97') which is the average lateral position of the centerline belt path (83, 83') along the rotational axis (63, 63') where the back (7, 7') of the flat belt (4, 4') is in contact with the first pulley outer surface (89, 89'); and
  d. a second pulley (68, 68') having a rotational axis (76, 76') and an outer surface (91, 91') supporting the back (7, 7') of the flat belt (4, 4') with a return velocity plane (75, 75') perpendicular to the rotational axis (76, 76') which intersects the second pulley average contact centerline belt path (99, 99') which is the average lateral position of the centerline belt path (83, 83') along the rotational axis (76, 76') where the back (7, 7') of the flat belt (4, 4') is in contact with the second pulley outer surface (91, 91'), wherein:
    i. the flat belt (4, 4') has an upper conveyance surface (30, 30');
    ii. the conveyance surface (30, 30') has an entrance portion (86, 86') and an entrance velocity plane (58, 58') proximate the first roller (65);
    iii. the conveyance surface (30, 30') has an exit portion (87, 87'), and an exit velocity plane (62, 62') proximate the first pulley (67, 67');
    iv. the first pulley (67, 67') deflects the flat belt (4, 4') from the entrance velocity plane (58, 58') to the exit velocity plane (62, 62');
    v. the entrance velocity plane (58, 58') and the exit velocity plane (62, 62') are not coplanar and not parallel; and
    vi. the return velocity plane (75, 75') is substantially coplanar with the exit velocity plane (62, 62').

13. The plurality of flat belts (4, 4') and support systems (84, 84') of claim 12, wherein the lateral positioning (47) of each of the second pulleys (68, 68') controls the lateral positioning of each associated entrance velocity plane (58, 58').

14. The plurality of flat belts (4, 4') and support systems (84, 84') of claim 12, wherein each of the exit velocity planes (62, 62') is adjustable to any selected degree of not coplanar and not parallel to each associated entrance velocity plane (58, 58') by adjusting the position of each first pulley (67, 67') and simultaneously adjusting each associated second pulley (68, 68') in order to keep each associated return velocity plane (75, 75') substantially coplanar with each associated exit velocity plane (62, 62').

15. The plurality of flat belts (4, 4') and support systems (84, 84') of claim 12, wherein each of the entrance velocity planes (58, 58') is laterally (47) movable along the rotational axis (59) of the first roller (65) while rotating the first roller (65) to permit each of the flat belts (4, 4') to maintain proper tracking of each associated second pulley (68, 68').

16. The plurality of flat belts (4, 4') and support systems (84, 84') of claim 12, wherein the first pulleys (67, 67') and second pulleys (68, 68') are crowned (24) to improve the ability of the flat belts (4, 4') to track the associated first pulleys (67, 67') and second pulleys (68, 68').

17. The plurality of flat belts (4, 4') and support systems (84, 84') of claim 12, wherein a spatial relationship exists between the first roller (65), each first pulley (67, 67') and each associated second pulley (68, 68') such that the tangent surface vector (78, 78') created by the first roller (65) and each first pulley (67, 67') is substantially perpendicular to the tangent surface vector (79, 79') created by the first roller (65) and each associated second pulley (68, 68').

18. The plurality of flat belts (4, 4') and support systems (84, 84') of claim 12, wherein a torque source (94) is operatively connected to the first roller (65) to provide driving power for the plurality of flat belts (4, 4') through friction between the back (7, 7') of each flat belt (4, 4') and the outer surface (88) of the first roller (65).

19. The plurality of flat belts (4, 4') and support systems (95, 95') of claim 12, wherein a second roller (66) having a rotational axis (72) and an outer surface (90) is positioned between the plurality second pulleys (68, 68') and the first roller (65), with the second roller rotational axis (72) parallel to the first roller rotational axis (59) such that the covers (10, 10') of the plurality of flat belts (4, 4') contacts the surface (90) of the second roller (66) which increases the amount of surface contact between the first roller surface (88) and the back (7, 7') of each flat belt (4, 4') and increases the amount of surface contact between each second pulley outer surface (91, 91') and the back (7, 7') of each of the plurality of flat belts (4, 4').

20. The plurality of flat belts (4, 4') and support systems (95, 95') of claim 19, wherein a torque source (94) is operatively connected to the second roller (66) to provide driving power for the plurality of flat belts (4, 4') through friction between the cover (10, 10') of each flat belt (4, 4') and the outer surface (90) of the second roller (66).

21. The plurality of flat belts (4, 4') and support systems (84, 84') of claim 12, wherein the conveyance surfaces (30, 30') convey objects (38) from the entrance portions (86, 86') proximate the first roller (65) to the exit portions (87, 87') proximate the first pulleys (67, 67').

22. The plurality of flat belts (4, 4') and support systems (84, 84') of claim 21, wherein the conveyed objects (38) are flat boxes (41).

23. The plurality of flat belts (4, 4') and support systems (84, 84') of claim 12, wherein the flat belts (4, 4') and support systems (84, 84') are integrated into a sheet stacking machine (54) which conveys flat boxes (41) for the purpose of producing stacks of boxes (50).

* * * * *